(12) United States Patent
Shi et al.

(10) Patent No.: US 11,477,679 B2
(45) Date of Patent: Oct. 18, 2022

(54) MEASUREMENT METHOD AND DEVICE, INFORMATION INTERCHANGE METHOD AND DEVICE, AND RESIDENCE METHOD AND DEVICE

(71) Applicant: Huawei Technologies Co., Ltd., Shenzhen (CN)

(72) Inventors: Jie Shi, Shenzhen (CN); Li Chai, Shenzhen (CN); Yajuan Li, Shenzhen (CN); Hao Bi, Rolling Meadows, IL (US); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 16/942,348

(22) Filed: Jul. 29, 2020

(65) Prior Publication Data
US 2020/0359249 A1 Nov. 12, 2020

Related U.S. Application Data

(63) Continuation of application No. 15/903,723, filed on Feb. 23, 2018, now Pat. No. 10,764,774, which is a (Continued)

(30) Foreign Application Priority Data

Aug. 9, 2013 (WO) ................ PCT/CN2013/081218

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

2008/0132230 A1 6/2008 Marinier et al.
2008/0232284 A1* 9/2008 Dalsgaard ........... H04W 72/042
370/310
(Continued)

FOREIGN PATENT DOCUMENTS

CN 101621851 A 1/2010
CN 101873530 A 10/2010
(Continued)

OTHER PUBLICATIONS

"DRX for dual connectivity," 3GPP TSG-RAN WG2 #83bis Ljubljana, Slovenia, R2-133433, 3rd Generation Partnership Project, Valbonne, France (Oct. 7-11, 2013).
(Continued)

*Primary Examiner* — Diane L Lo
(74) *Attorney, Agent, or Firm* — Leydig, Voit & Mayer, Ltd.

(57) ABSTRACT

Disclosed are measurement method and device, information interchange method and device and residence method and device. The measurement method includes configuring measurement configuration information about a UE and sending same, the measurement configuration information including a measurement report trigger condition for a reference cell, so that the UE reports a measurement result when satisfying the measurement report trigger condition. The information interchange method includes interchanging discontinuous data transmission parameter configuration information with a fourth base station, so that a base station side executes scheduling and/or mobility management on a user equipment. The residence method includes sending indication information to a UE, the indication information being used
(Continued)

for indicating whether the UE can reside in this cell or not, an object of the UE that can be resident, an object of the UE that cannot be resident, and at least one of the size and type of the cell.

11 Claims, 8 Drawing Sheets

Related U.S. Application Data continuation of application No. 15/015,808, filed on Feb. 4, 2016, now Pat. No. 9,967,765, which is a continuation of application No. PCT/CN2013/086454, filed on Nov. 1, 2013.

(56) References Cited

U.S. PATENT DOCUMENTS

| | | | |
|---|---|---|---|
| 2009/0046641 | A1 | 2/2009 | Wang et al. |
| 2009/0168731 | A1* | 7/2009 | Zhang .................. H04L 1/1854 370/336 |
| 2009/0247150 | A1 | 10/2009 | Fischer et al. |
| 2009/0303927 | A1* | 12/2009 | Kolding ............... H04W 76/28 370/328 |
| 2010/0195605 | A1* | 8/2010 | Suzuki ............... H04W 72/042 370/329 |
| 2011/0158118 | A1 | 6/2011 | Chou et al. |
| 2011/0164583 | A1* | 7/2011 | Kim ......................... H04B 7/26 370/329 |
| 2011/0212693 | A1 | 9/2011 | Saagfors et al. |
| 2012/0140689 | A1 | 6/2012 | Pelletier et al. |
| 2012/0149419 | A1 | 6/2012 | Roh |
| 2013/0100838 | A1 | 4/2013 | Iwamura et al. |
| 2013/0194931 | A1 | 8/2013 | Lee et al. |
| 2013/0201919 | A1 | 8/2013 | Bai et al. |
| 2013/0331081 | A1 | 12/2013 | Rune et al. |
| 2014/0087731 | A1 | 3/2014 | Zhang et al. |
| 2014/0194125 | A1 | 7/2014 | Wen et al. |
| 2014/0378126 | A1 | 12/2014 | Uchino et al. |
| 2015/0004995 | A1* | 1/2015 | Koc ....................... H04W 88/02 455/454 |
| 2015/0029920 | A1 | 1/2015 | Hoehne et al. |
| 2015/0189590 | A1* | 7/2015 | Hu .................... H04W 52/0212 370/311 |
| 2015/0230174 | A1 | 8/2015 | Futaki et al. |
| 2016/0192433 | A1 | 6/2016 | Deenoo et al. |

FOREIGN PATENT DOCUMENTS

| | | |
|---|---|---|
| CN | 101873612 A | 10/2010 |
| CN | 102014422 A | 4/2011 |
| CN | 102104910 A | 6/2011 |
| CN | 102404848 A | 4/2012 |
| CN | 102802220 A | 11/2012 |
| CN | 102843768 A | 12/2012 |
| CN | 102870454 A | 1/2013 |
| CN | 102905286 A | 1/2013 |
| CN | 103155687 A | 6/2013 |
| EP | 2424287 A1 | 2/2012 |
| EP | 2552147 A2 | 1/2013 |
| EP | 2566227 A1 | 3/2013 |
| EP | 2566236 A2 | 3/2013 |
| EP | 2624646 A2 | 8/2013 |
| JP | 2013516127 A | 5/2013 |
| WO | 2010059926 A1 | 5/2010 |
| WO | 2010140797 A2 | 12/2010 |
| WO | 2011146293 A1 | 11/2011 |
| WO | 2012125499 A1 | 9/2012 |

OTHER PUBLICATIONS

"3rd Generation Partnership Project; Technical Specification Group Radio Access Network; Evolved Universal Terrestrial Radio Access (E-UTRA); Multiplexing and channel coding(Release 11)," 3GPP TS 36.212 V11.3.0, 3rd Generation Partnership Project, Valbonne, France (Jun. 2013).

"3rd Generation Partnership Project;Technical Specification Group Radio Access Network;Evolved Universal Terrestrial Radio Access (E-UTRA);Physical layer procedures(Release 11)," 3GPP TS 36.213 V11.3.0, 3rd Generation Partnership Project, Valbonne, France (Jun. 2013).

"3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11)," 3GPP TS 36.300 V11.6.0, 3rd Generation Partnership Project, Valbonne, France (Jun. 2013).

"3rd Generation Partnership Project;Technical Specification Group Radio Access Network;Evolved Universal Terrestrial Radio Access (E-UTRA);Radio Resource Control (RRC);Protocol specification(Release 11)," 3GPP TS 36.331 V11.4.0, 3rd Generation Partnership Project, Valbonne, France (Jun. 2013).

"3rd Generation Partnership Project;Technical Specification Group Radio Access Network;Evolved Universal Terrestrial Radio Access Network (E-UTRAN);X2 application protocol (X2AP)(Release 11)," 3GPP TS 36.423 V11.5.0, 3rd Generation Partnership Project, Valbonne, France (Jun. 2013).

"Consideration on CoMP for LTE-Advanced," 3GPP TSG RAN WG1 #54, Jeju Korea, R1-083049, 3rd Generation Partnership Project, Valbonne, France (Aug. 18-22, 2008).

"A Discussion of Control Plane Issues for Dual Connectivity," 3GPP TSG-RAN WG2#82, Fukuoka, Japan, R2-132025, 3rd Generation Partnership Project, Valbonne, France (May 20-24, 2013).

"3rd Generation Partnership Project;Technical Specification Group Radio Access Network;Evolved Universal Terrestrial Radio Access (E-UTRA);Radio Resource Control (RRC);Protocol specification(Release 11)," 3GPP TS 36.331 V11.3.0, 3rd Generation Partnership Project, Valbonne, France (Mar. 2013).

"3rd Generation Partnership Project; Technical Specification Group Radio Access Network; Radio Resource Control (RRC); Protocol specification (Release 9)," 3GPP TS 25.331 V9.15.0, pp. 1-1840, 3rd Generation Partnership Project, Valbonne, France (Jun. 2013).

"Issues for clarification regarding Rel-7 DTX-DRX operation," 3GPP TSG-RAN WG2 Meeting#64bis, Ljubljana, Slovenia, R2-090237, 3rd Generation Partnership Project, Valbonne, France (Jan. 12-16, 2009).

U.S. Appl. No. 15/903,723, filed Feb. 23, 2018.
U.S. Appl. No. 15/015,808, filed Feb. 4, 2016.

\* cited by examiner

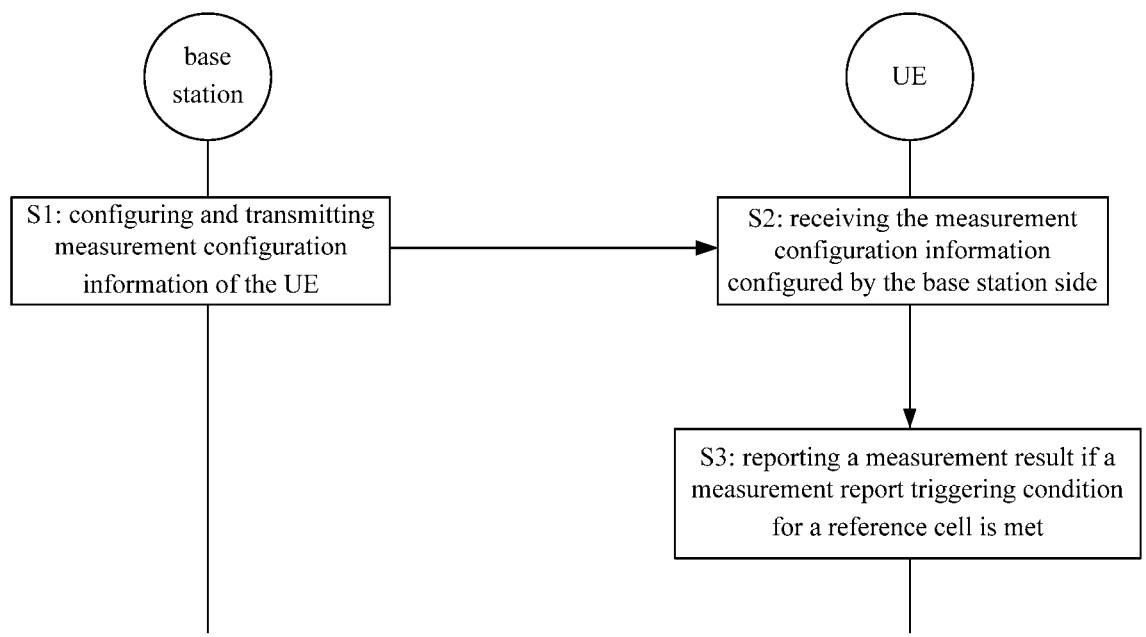

MEASUREMENT METHOD AND DEVICE, INFORMATION INTERCHANGE METHOD AND DEVICE, AND RESIDENCE METHOD AND DEVICE

CROSS-REFERENCE TO RELATED APPLICATIONS

This application is a continuation of U.S. patent application Ser. No. 15/903,723, filed on Feb. 23, 2018, which is a continuation of U.S. patent application Ser. No. 15/015,808, filed on Feb. 4, 2016, now U.S. Pat. No. 9,967,765. which is a continuation of International Patent Application No. PCT/CN2013/086454, filed on Nov. 1, 2013, which claims priority to International Patent Application No. PCT/CN2013/081218, filed on Aug. 9, 2013. All of the aforementioned patent applications are hereby incorporated by reference in their entireties.

FIELD

The disclosure relates to the field of communication technology, and in particular to a measuring method and apparatus, an information interacting method and apparatus, and a residing method and apparatus.

BACKGROUND

In order to further improve capacity of the network, a network architecture evolves from a homogeneous network to a heterogeneous network. Usually, there are multiple access points in the coverage of an access point of a macro base station. A UE may keep wireless connection with the multiple access points.

It was discovered that the above multiple access points connect to one base station through optical fiber in the conventional technology. With the evolution of the network, multiple access points may not connect to one base station, that is, the multiple access points communicating with the UE may belong to different base stations. In this way, operations or processes applied to the case that the multiple access points connect to one base station have to be optimized as the network evolves.

SUMMARY

In view of the above, an object of embodiments of the disclosure is to provide a measuring method, a measuring apparatus, an information interacting method, an information interacting apparatus, a residing method and a residing apparatus, which are optimized with the evolution of the network.

To achieve the above object, technical solutions as follows are provided according to embodiments of the disclosure.

According to a first aspect of an embodiment of the disclosure, it is provided a measuring method, including: configuring and transmitting measurement configuration information of a user equipment (UE), where the measurement configuration information includes at least a measurement report triggering condition for a reference cell, so that the UE reports a measurement result if the measurement report triggering condition for the reference cell is met.

In conjunction with the first aspect, in a first possible implementation, the measurement report triggering condition for the reference cell includes at least one of a first triggering condition and a second triggering condition;

the first triggering condition includes: signal quality of a neighbor cell being higher than signal quality of the reference cell by a threshold; and the second triggering condition includes: signal quality of the reference cell being lower than a first absolute threshold and signal quality of a neighbor cell being higher than a second absolute threshold.

In conjunction with the first possible implementation of the first aspect, in a second possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, any cell in a set of reference cells, all cells in the set of reference cells, a cell meeting a first preset condition in the set of reference cells, and a specified cell.

In conjunction with the first aspect or the first possible implementation of the first aspect, in a third possible implementation, the measuring method further includes:

configuring a cell keeping wireless communication with the UE to be a primary cell, where the primary cell acts as the reference cell, so that the UE reports the measurement result if signal quality of a neighbor cell is higher than signal quality of the primary cell by a threshold or if signal quality of the primary cell is lower than a first absolute threshold and signal quality of a neighbor cell is higher than a second absolute threshold.

In conjunction with the first aspect, in a fourth possible implementation, the measurement report triggering condition for the reference cell includes at least one of a third triggering condition, a fourth triggering condition and a fifth triggering condition;

the third triggering condition includes: signal quality of the reference cell being higher than a third absolute threshold;

the fourth triggering condition includes: signal quality of the reference cell being lower than a fourth absolute threshold; and the fifth triggering condition includes: signal quality of a neighbor cell being higher than signal quality of the reference cell by a threshold.

In conjunction with the fourth possible implementation of the first aspect, in a fifth possible implementation, the reference cell includes at least one of: a serving cell of a specified base station, a secondary cell of a specified base station, a specified serving cell, a specified secondary cell, a primary cell of a specified base station, a default primary cell, serving cells of a first base station and a second base station, a cell meeting a first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the first aspect, in a sixth possible implementation, the measurement report triggering condition for the reference cell includes a sixth triggering condition: periodically reporting the measurement result for the reference cell.

In conjunction with the sixth possible implementation of the first aspect, in a seventh possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, a specified cell, any cell in a set of reference cells, all cells in the set of reference cells, a cell meeting a first preset condition in the set of reference cells, a serving cell of a specified base station, a secondary cell of a specified base station, a specified serving cell, a specified secondary cell, a primary cell of a specified base station, a default primary cell, serving cells of the first base station and the second base station, a cell meeting the first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the second possible implementation of the first aspect or the seventh possible implementation of the first aspect, in an eighth possible implementation, the cell of the first base station includes at least one of: a primary cell of the first base station, and a cell, which keeps timing alignment with the UE, of the first base station.

In conjunction with the second possible implementation of the first aspect or the seventh possible implementation of the first aspect, in a ninth possible implementation, the cell of the second base station includes at least one of: a primary cell of the second base station, and a cell, which keeps timing alignment with the UE, of the second base station.

In conjunction with the second possible implementation of the first aspect or the seventh possible implementation of the first aspect, in a tenth possible implementation, the set of reference cells includes at least one of: primary cells of all the base stations, a primary cell of a specified base station, and all primary cells providing wireless link to the UE.

In conjunction with the fifth possible implementation of the first aspect or the seventh possible implementation of the first aspect, in an eleventh possible implementation, the specified secondary cell includes a primary cell of the second base station.

In conjunction with any one of the first possible implementation to the eleventh possible implementation of the first aspect, in a twelfth possible implementation, the neighbor cell includes at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

In conjunction with the twelfth possible implementation of the first aspect, in a thirteenth possible implementation, the primary cell includes a cell which meets a second preset condition, where the second preset condition includes at least one of: being subjected to wireless link monitor performed by the UE, transmitting an RRC message to the UE, transmitting a packet after RRC message processing to the UE, and generating an RRC message.

In conjunction with the twelfth possible implementation of the first aspect, in a fourteenth possible implementation, the reference cell and the neighbor cell are intra-frequency cells, or the reference cell and the neighbor cell are inter-frequency cells, or the reference cell and the neighbor cell are intra-frequency cells but operate in different time domains and/or different frequency bands.

In conjunction with the twelfth possible implementation of the first aspect, in a fifteenth possible implementation, any cell in the set of reference cells and any another cell in the set of reference cells are intra-frequency cells or inter-frequency cells;

any cell in the set of serving cells and any another cell in the set of serving cells are intra-frequency cells or inter-frequency cells; and any cell in the set of secondary cells and any another cell in the set of secondary cells are intra-frequency cells or inter-frequency cells.

In conjunction with any one of the second possible implementation to the fifteenth possible implementation of the first aspect, in a sixteenth possible implementation, the first preset condition includes: signal quality being the highest, or signal quality being the lowest, or signal quality being in top N, or signal quality being in last M, or signal quality being the X-th high or signal quality being the Y-th low, where N, M, X and Y are natural numbers.

In conjunction with the sixteenth possible implementation of the first aspect, in a seventeenth possible implementation, the cell which meets the first preset condition is selected periodically according to a preset periodicity, and/or the cell which meets the first preset condition is selected when a selection triggering condition is met.

In conjunction with the seventeenth possible implementation of the first aspect, in an eighteenth possible implementation, the periodicity includes at least one of: a periodicity based on the UE, a periodicity based on the measurement report triggering condition, a periodicity based on a cell, and a periodicity based on cell frequency.

In conjunction with the eighteenth possible implementation of the first aspect, in a nineteenth possible implementation, the selection triggering condition at least includes: a fluctuation of the measurement result exceeding a threshold.

In conjunction with the nineteenth possible implementation of the first aspect, in a twentieth possible implementation, the fluctuation includes at least one of a first fluctuation and a second fluctuation.

In conjunction with the twentieth possible implementation of the first aspect, in a twenty-first possible implementation, the first fluctuation includes: a current measurement result fluctuating compared with a history measurement result for a particular cell or any cell in a set; and the second fluctuation includes at least one of: a compare value between current measurement results of any two cells in a same set fluctuating, a compare value between current measurement results of two selected cells in a same set fluctuating, and a compare value between current measurement results of a particular cell and any another cell in a same set fluctuating.

In conjunction with the twenty-first possible implementation of the first aspect, in a twenty-second possible implementation, the particular cell is a cell which meets the first preset condition.

In conjunction with any one of the first aspect to the twenty-second possible implementation of the first aspect, in a twenty-third possible implementation, the measuring method further includes: configuring a report object to which the measurement result of the UE is reported, so that the UE reports the measurement result to the corresponding report object if the measurement report triggering condition for the reference cell is met.

In conjunction with the twenty-first possible implementation of the first aspect, the twenty-second possible implementation of the first aspect or the twenty-third possible implementation of the first aspect, in a twenty-fourth possible implementation, the report object is a specified base station or a specified cell.

In conjunction with the twenty-third possible implementation of the first aspect or the twenty-fourth possible implementation of the first aspect, in a twenty-fifth possible implementation, configuring the report object to which the measurement result of the UE is reported includes:

mapping the report object to a measurement identification, so that the UE reports the measurement result to the report object mapped to the measurement identification.

In conjunction with the twenty-third possible implementation of the first aspect or the twenty-fourth possible implementation of the first aspect, in a twenty-sixth possible implementation, configuring the report object to which the measurement result of the UE is reported includes: mapping the report object to a specified measurement report triggering condition, so that the UE reports the measurement result to the report object mapped to the specified measurement report triggering condition.

In conjunction with the twelfth possible implementation of the first aspect, in a twenty-seventh possible implementation, the primary cell includes a cell having a physical uplink control channel in uplink.

According to a second aspect of an embodiment of the disclosure, it is provided a measuring method, including: configuring and transmitting measurement configuration information of a user equipment UE, where the measurement configuration information includes at least a measurement report triggering condition for a reference cell, so that the UE reports a measurement result if the measurement report triggering condition for the reference cell is met.

In conjunction with the second aspect, in a first possible implementation, the measurement report triggering condition for the reference cell includes at least one of a first triggering condition and a second triggering condition;

the first triggering condition includes: signal quality of a neighbor cell being higher than signal quality of the reference cell by a threshold; and the second triggering condition includes: signal quality of the reference cell being lower than a first absolute threshold and signal quality of a neighbor cell being higher than a second absolute threshold.

In conjunction with the first possible implementation of the second aspect, in a second possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, any cell in a set of reference cells, all cells in the set of reference cells, a cell meeting a first preset condition in the set of reference cells, and a specified cell.

In conjunction with the second aspect or the first possible implementation of the second aspect, in a third possible implementation, the measuring method further includes:

configuring a cell keeping wireless communication with the UE to be a primary cell, where the primary cell acts as the reference cell, so that the UE reports the measurement result if signal quality of a neighbor cell is higher than signal quality of the primary cell by a threshold or if signal quality of the primary cell is lower than a first absolute threshold and signal quality of a neighbor cell is higher than a second absolute threshold.

In conjunction with the second aspect, in a fourth possible implementation, the measurement report triggering condition for the reference cell includes at least one of a third triggering condition, a fourth triggering condition and a fifth triggering condition;

the third triggering condition includes: signal quality of the reference cell being higher than a third absolute threshold;

the fourth triggering condition includes: signal quality of the reference cell being lower than a fourth absolute threshold; and the fifth triggering condition includes: signal quality of a neighbor cell being higher than signal quality of the reference cell by a threshold.

In conjunction with the fourth possible implementation of the second aspect, in a fifth possible implementation, the reference cell includes at least one of: a serving cell of a specified base station, a secondary cell of a specified base station, a specified serving cell, a specified secondary cell, a primary cell of a specified base station, a default primary cell, serving cells of a first base station and a second base station, a cell meeting a first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the second aspect, in a sixth possible implementation, the measurement report triggering condition for the reference cell includes a sixth triggering condition: periodically reporting the measurement result for the reference cell.

In conjunction with the sixth possible implementation of the second aspect, in a seventh possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, a specified cell, any cell in a set of reference cells, all cells in the set of reference cells, a cell meeting a first preset condition in the set of reference cells, a serving cell of a specified base station, a secondary cell of a specified base station, a specified serving cell, a specified secondary cell, a primary cell of a specified base station, a default primary cell, serving cells of the first base station and the second base station, a cell meeting the first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the second possible implementation of the second aspect or the seventh possible implementation of the second aspect, in an eighth possible implementation, the cell of the first base station includes at least one of: a primary cell of the first base station, and a cell, which keeps timing alignment with the UE, of the first base station.

In conjunction with the second possible implementation of the second aspect or the seventh possible implementation of the second aspect, in a ninth possible implementation, the cell of the second base station includes at least one of: a primary cell of the second base station, and a cell, which keeps timing alignment with the UE, of the second base station.

In conjunction with the second possible implementation of the second aspect or the seventh possible implementation of the second aspect, in a tenth possible implementation, the set of reference cells includes at least one of: primary cells of all the base stations, a primary cell of a specified base station, and all primary cells providing wireless link to the UE.

In conjunction with the fifth possible implementation of the second aspect or the seventh possible implementation of the second aspect, in an eleventh possible implementation, the specified secondary cell includes a primary cell of the second base station.

In conjunction with any one of the first possible implementation to the eleventh possible implementation of the second aspect, in a twelfth possible implementation, the neighbor cell includes at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

In conjunction with the twelfth possible implementation of the second aspect, in a thirteenth possible implementation, the primary cell includes a cell which meets a second preset condition, where the second preset condition includes at least one of: being subjected to wireless link monitor performed by the UE, transmitting an RRC message to the UE, transmitting a packet after RRC message processing to the UE, and generating an RRC message.

In conjunction with the twelfth possible implementation of the second aspect, in a fourteenth possible implementation, the reference cell and the neighbor cell are intra-frequency cells, or the reference cell and the neighbor cell are inter-frequency cells, or the reference cell and the neighbor cell are intra-frequency cells but operate in different time domains and/or different frequency bands.

In conjunction with the twelfth possible implementation of the second aspect, in a fifteenth possible implementation, any cell in the set of reference cells and any another cell in the set of reference cells are intra-frequency cells or inter-frequency cells;

any cell in the set of serving cells and any another cell in the set of serving cells are intra-frequency cells or inter-frequency cells; and any cell in the set of secondary cells and any another cell in the set of secondary cells are intra-frequency cells or inter-frequency cells.

In conjunction with any one of the second possible implementation to the fifteenth possible implementation of the second aspect, in a sixteenth possible implementation, the first preset condition includes: signal quality being the highest, or signal quality being the lowest, or signal quality being in top N, or signal quality being in last M, or signal quality being the X-th high or signal quality being the Y-th low, where N, M, X and Y are natural numbers.

In conjunction with the sixteenth possible implementation of the second aspect, in a seventeenth possible implementation, the cell which meets the first preset condition is selected periodically according to a preset periodicity, and/or the cell which meets the first preset condition is selected when a selection triggering condition is met.

In conjunction with the seventeenth possible implementation of the second aspect, in an eighteenth possible implementation, the periodicity includes at least one of: a periodicity based on the UE, a periodicity based on the measurement report triggering condition, a periodicity based on a cell, and a periodicity based on cell frequency.

In conjunction with the eighteenth possible implementation of the second aspect, in a nineteenth possible implementation, the selection triggering condition at least includes: a fluctuation of the measurement result exceeding a threshold.

In conjunction with the nineteenth possible implementation of the second aspect, in a twentieth possible implementation, the fluctuation includes at least one of a first fluctuation and a second fluctuation.

In conjunction with the twentieth possible implementation of the second aspect, in a twenty-first possible implementation, the first fluctuation includes: a current measurement result fluctuating compared with a history measurement result for a particular cell or any cell in a set; and the second fluctuation includes at least one of: a compare value between current measurement results of any two cells in a same set fluctuating, a compare value between current measurement results of two selected cells in a same set fluctuating, and a compare value between current measurement results of a particular cell and any another cell in a same set fluctuating.

In conjunction with the twenty-first possible implementation of the second aspect, in a twenty-second possible implementation, the particular cell is a cell which meets the first preset condition In conjunction with any one of the second aspect to the twenty-second possible implementation of the second aspect, in a twenty-third possible implementation, the measuring method further includes: configuring a report object to which the measurement result of the UE is reported, so that the UE reports the measurement result to the corresponding report object if the measurement report triggering condition for the reference cell is met.

In conjunction with the twenty-first possible implementation of the second aspect, the twenty-second possible implementation of the second aspect or the twenty-third possible implementation of the second aspect, in a twenty-fourth possible implementation, the report object is a specified base station or a specified cell.

In conjunction with the twenty-third possible implementation of the second aspect or the twenty-fourth possible implementation of the second aspect, in a twenty-fifth possible implementation, configuring the report object to which the measurement result of the UE is reported includes:

mapping the report object to a measurement identification, so that the UE reports the measurement result to the report object mapped to the measurement identification.

In conjunction with the twenty-third possible implementation of the second aspect or the twenty-fourth possible implementation of the second aspect, in a twenty-sixth possible implementation, configuring the report object to which the measurement result of the UE is reported includes: mapping the report object to a specified measurement report triggering condition, so that the UE reports the measurement result to the report object mapped to the specified measurement report triggering condition.

In conjunction with the twelfth possible implementation of the second aspect, in a twenty-seventh possible implementation, the primary cell includes a cell having a physical uplink control channel in uplink.

According to a second aspect of an embodiment of the disclosure, it is provided a measuring method performed by a user equipment UE, including:

receiving measurement configuration information configured by a base station side, where the measurement configuration information includes at least a measurement report triggering condition for a reference cell; and reporting a measurement result if the measurement report triggering condition for the reference cell is met.

In conjunction with the second aspect, in a first possible implementation, the measurement report triggering condition for the reference cell includes at least one of a first triggering condition and a second triggering condition;

the first triggering condition includes: signal quality of a neighbor cell being higher than signal quality of the reference cell by a threshold; and the second triggering condition includes: signal quality of the reference cell being lower than a first absolute threshold and signal quality of a neighbor cell being higher than a second absolute threshold.

In conjunction with the first possible implementation of the second aspect, in a second possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, any cell in a set of reference cells, all cells in the set of reference cells, a cell meeting a first preset condition in the set of reference cells, and a specified cell.

In conjunction with the second aspect or the first possible implementation of the second aspect, in a third possible implementation, the measuring method further includes:

reporting the measurement result if signal quality of a neighbor cell is higher than signal quality of a primary cell configured by the base station side by a threshold or if signal quality of a primary cell configured by the base station side is lower than a first absolute threshold and signal quality of a neighbor cell is higher than a second absolute threshold, where the primary cell acts as the reference cell; and the primary cell is a cell keeping wireless communication with the UE.

In conjunction with the second aspect, in a fourth possible implementation, the measurement report triggering condition for the reference cell includes at least one of a third triggering condition, a fourth triggering condition and a fifth triggering condition;

the third triggering condition includes: signal quality of the reference cell being higher than a third absolute threshold;

the fourth triggering condition includes: signal quality of the reference cell being lower than a fourth absolute threshold; and the fifth triggering condition includes: signal quality of a neighbor cell being higher than signal quality of the reference cell by a threshold.

In conjunction with the fourth possible implementation of the second aspect, in a fifth possible implementation, the reference cell includes at least one of: a serving cell of a specified base station, a secondary cell of a specified base station, a specified serving cell, a specified secondary cell, a primary cell of a specified base station, a default primary cell, serving cells of a first base station and a second base station, a cell meeting a first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the second aspect, in a sixth possible implementation, the measurement report triggering condition for the reference cell includes a sixth triggering condition: periodically reporting the measurement result for the reference cell.

In conjunction with the sixth possible implementation of the second aspect, in a seventh possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, a specified cell, any cell in a set of reference cells, all cells in the set of reference cells, a cell meeting a first preset condition in the set of reference cells, a serving cell of a specified base station, a secondary cell of a specified base station, a specified serving cell, a specified secondary cell, a primary cell of a specified base station, a default primary cell, serving cells of the first base station and the second base station, a cell meeting the first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

In conjunction with the second possible implementation of the second aspect or the seventh possible implementation of the second aspect, in an eighth possible implementation, the cell of the first base station includes at least one of: a primary cell of the first base station, and a cell, which keeps timing alignment with the UE, of the first base station;

the cell of the second base station includes at least one of: a primary cell of the second base station, and a cell, which keeps timing alignment with the UE, of the second base station;

the set of reference cells includes at least one of: primary cells of all the base stations, a primary cell of a specified base station, and all primary cells providing wireless link to the UE; and the specified secondary cell includes a primary cell of the second base station.

In conjunction with any one of the first possible implementation to the eighth possible implementation of the second aspect, in a ninth possible implementation, the neighbor cell includes at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

In conjunction with the ninth possible implementation of the second aspect, in a tenth possible implementation, the primary cell includes a cell which meets a second preset condition, where the second preset condition includes at least one of: being subjected to wireless link monitor performed by the UE, transmitting an RRC message to the UE, transmitting a packet after RRC message processing to the UE, and generating an RRC message.

In conjunction with the ninth possible implementation of the second aspect, in an eleventh possible implementation, the reference cell and the neighbor cell are intra-frequency cells, or the reference cell and the neighbor cell are inter-frequency cells, or the reference cell and the neighbor cell are intra-frequency cells but operate in different time domains and/or different frequency bands.

In conjunction with the ninth possible implementation of the second aspect, in a twelfth possible implementation, any cell in the set of reference cells and any another cell in the set of reference cells are intra-frequency cells or inter-frequency cells;

any cell in the set of serving cells and any another cell in the set of serving cells are intra-frequency cells or inter-frequency cells; and any cell in the set of secondary cells and any another cell in the set of secondary cells are intra-frequency cells or inter-frequency cells.

In conjunction with any one of the second possible implementation to the twelfth possible implementation of the second aspect, in a thirteenth possible implementation, the first preset condition includes: signal quality being the highest, or signal quality being the lowest, or signal quality being in top N, or signal quality being in last M, or signal quality being the X-th high or signal quality being the Y-th low, where N, M, X and Y are natural numbers.

In conjunction with the thirteenth possible implementation of the second aspect, in a fourteenth possible implementation, the cell which meets the first preset condition is selected periodically according to a preset periodicity, and/or the cell which meets the first preset condition is selected when a selection triggering condition is met.

In conjunction with the fourteenth possible implementation of the second aspect, in a fifteenth possible implementation, the periodicity includes at least one of: a periodicity based on the UE, a periodicity based on the measurement report triggering condition, a periodicity based on a cell, and a periodicity based on cell frequency.

In conjunction with the fifteenth possible implementation of the second aspect, in a sixteenth possible implementation, the selection triggering condition at least includes: a fluctuation of the measurement result exceeding a threshold.

In conjunction with the sixteenth possible implementation of the second aspect, in a seventeenth possible implementation, the fluctuation includes at least one of a first fluctuation and a second fluctuation.

In conjunction with the seventeenth possible implementation of the second aspect, in an eighteenth possible implementation, the first fluctuation includes: a current measurement result fluctuating compared with a history measurement result for a particular cell or any cell in a set; and the second fluctuation includes at least one of: a compare value between current measurement results of any two cells in a same set fluctuating, a compare value between current measurement results of two selected cells in a same set fluctuating, and a compare value between current measurement results of a particular cell and any another cell in a same set fluctuating.

In conjunction with the eighteenth possible implementation of the second aspect, in a nineteenth possible implementation, the particular cell is a cell which meets the first preset condition.

In conjunction with any one of the second aspect to the nineteenth possible implementation of the second aspect, in a twentieth possible implementation, the measuring method further includes: receiving a report object, which is configured by the base station side, to which the measurement result is reported.

In conjunction with the twentieth possible implementation of the second aspect, in a twenty-first possible implementation, reporting the measurement result includes: reporting the measurement result to the corresponding report object.

In conjunction with the twentieth possible implementation of the second aspect or the twenty-first possible implementation of the second aspect, in a twenty-second possible implementation, the report object is mapped to a measurement identification; and reporting the measurement result to the corresponding report object includes: reporting the measurement result to the report object mapped to the measurement identification.

In conjunction with the twentieth possible implementation of the second aspect or the twenty-first possible implementation of the second aspect, in a twenty-third possible implementation, the report object is mapped to a specified measurement report triggering condition; and reporting the measurement result to the corresponding report object includes:

reporting the measurement result to the report object mapped to the specified measurement report triggering condition.

According to a third aspect of an embodiment of the disclosure, it is provided a measuring method, including:

configuring a report object to which a measurement result of a user equipment UE is reported, so that the UE reports the measurement result to the corresponding report object.

In conjunction with the third aspect, in a first possible implementation, the report object is a specified base station or a specified cell.

In conjunction with the third aspect or the first possible implementation of the third aspect, in a second possible implementation, configuring the report object to which the measurement result of the UE is reported includes: mapping the report object to a measurement identification, so that the UE reports the measurement result to the report object mapped to the measurement identification.

In conjunction with the third aspect or the first possible implementation of the third aspect, in a third possible implementation, configuring the report object to which the measurement result of the UE is reported includes:

mapping the report object to a specified measurement report triggering condition, so that the UE reports the measurement result to the report object mapped to the specified measurement report triggering condition.

According to a fourth aspect of an embodiment of the disclosure, it is provided a measuring method, including:

receiving a report object, which is configured by a base station side, to which a measurement result is reported; and reporting the measurement result to the corresponding report object.

In conjunction with the fourth aspect, in a first possible implementation, the report object is mapped to a measurement identification; and reporting the measurement result to the corresponding report object includes: reporting the measurement result to the report object mapped to the measurement identification.

In conjunction with the fourth aspect, in a second possible implementation, the report object is mapped to a specified measurement report triggering condition; and reporting the measurement result to the corresponding report object includes: reporting the measurement result to the report object mapped to the specified measurement report triggering condition.

According to a fifth aspect of an embodiment of the disclosure, it is provided an information interacting method performed by a third base station, including:

interacting with a fourth base station for configuration information of a discontinuous data transmission parameter, so that a base station side performs at least one of scheduling and mobility management on a user equipment, where the base station side includes at least one of the third base station and the fourth base station.

In conjunction with the fifth aspect, in a first possible implementation of the fifth aspect, interacting with the fourth base station for the configuration information of the discontinuous data transmission parameter is applied to a handover process, a setup process of a data distribution channel, a setup process of a base station interface, or an update process of base station configuration.

In conjunction with the fifth aspect or the first possible implementation of the fifth aspect, in a second possible implementation of the fifth aspect, interacting with the fourth base station for the configuration information of the discontinuous data transmission parameter includes: receiving configuration information of the discontinuous data transmission parameter of the fourth base station transmitted by the fourth base station.

In conjunction with the second possible implementation of the fifth aspect, in a third possible implementation of the fifth aspect, interacting with the fourth base station for the configuration information of the discontinuous data transmission parameter further includes: returning acknowledgment information.

In conjunction with the second possible implementation of the fifth aspect or the third possible implementation of the fifth aspect, in a fourth possible implementation of the fifth aspect, interacting with the fourth base station for the configuration information of the discontinuous data transmission parameter further includes: transmitting to the fourth base station configuration information of the discontinuous data transmission parameter of the third base station, and/or transmitting to the fourth base station configuration information of the discontinuous data transmission parameter which is suggested to be used by the fourth base station.

In conjunction with the fourth possible implementation of the fifth aspect, in a fifth possible implementation of the fifth aspect, the configuration information of the discontinuous data transmission parameter of the third base station and/or the configuration information of the discontinuous data transmission parameter which is suggested to be used by the fourth base station is carried by the acknowledgment information.

In conjunction with any one of the second possible implementation to the fifth possible implementation of the fifth aspect, in a sixth possible implementation of the fifth aspect, interacting with the fourth base station for the configuration information of the discontinuous data transmission parameter further includes: initiating first request information to the fourth base station before receiving the configuration information of the discontinuous data transmission parameter of the fourth base station, where the first request information is configured to request the fourth base station to transmit the configuration information of the discontinuous data transmission parameter of the fourth base station.

In conjunction with the fourth possible implementation of the fifth aspect, in a seventh possible implementation of the fifth aspect, interacting with the fourth base station for the configuration information of the discontinuous data transmission parameter further includes:

receiving second request information initiated by the fourth base station before transmitting to the fourth base station the configuration information of the discontinuous data transmission parameter of the third base station and/or transmitting to the fourth base station the configuration information of the discontinuous data transmission parameter which is suggested to be used by the fourth base station, where the second request information is configured to request the third base station to transmit the configuration information of the discontinuous data transmission parameter of the third base station and/or transmit to the fourth base station the configuration information of the discontinuous data transmission parameter which is suggested to be used by the fourth base station.

In conjunction with the fifth aspect or the first possible implementation of the fifth aspect, in an eighth possible implementation of the fifth aspect, interacting with the fourth base station for the configuration information of the discontinuous data transmission parameter includes: receiving first data from a third party device; the first data from the third party device includes at least one of: configuration information of the discontinuous data transmission parameter of the fourth base station which is forwarded by the third party device; configuration information of the discontinuous data transmission parameter that the fourth base station suggests the third base station using and which is forwarded by the third party device; and configuration information of the discontinuous data transmission parameter that the third party device suggests the third base station using.

In conjunction with the eighth possible implementation of the fifth aspect, in a ninth possible implementation of the fifth aspect, interacting with the fourth base station for the configuration information of the discontinuous data transmission parameter further includes: initiating and transmitting first request information to the third party device before receiving the first data from the third party device, where the first request information is forwarded to the fourth base station by the third party device, and the first request information is at least configured to request the fourth base station to transmit the configuration information of the discontinuous data transmission parameter of the fourth base station.

In conjunction with the eighth possible implementation of the fifth aspect or the ninth possible implementation of the fifth aspect, in a tenth possible implementation of the fifth aspect, interacting with the fourth base station for the configuration information of the discontinuous data transmission parameter further includes: transmitting to the third party device the configuration information of the discontinuous data transmission parameter of the third base station, and/or transmitting to the third party device the configuration information of the discontinuous data transmission parameter which is suggested to be used by the fourth base station, so that the third party device forwards the configuration information of the discontinuous data transmission parameter.

In conjunction with the tenth possible implementation of the fifth aspect, in an eleventh possible implementation of the fifth aspect, interacting with the fourth base station for the configuration information of the discontinuous data transmission parameter further includes: receiving second request information initiated by the fourth base station and forwarded by the third party device before transmitting to the third party device the configuration information of the discontinuous data transmission parameter of the third base station and/or transmitting to the third party device the configuration information of the discontinuous data transmission parameter which is suggested to be used by the fourth base station, where the second request information is configured to request the third base station to transmit the configuration information of the discontinuous data transmission parameter of the third base station and/or transmit the configuration information of the discontinuous data transmission parameter which is suggested to be used by the fourth base station.

In conjunction with any one of the eighth possible implementation to the eleventh possible implementation of the fifth aspect, in a twelfth possible implementation of the fifth aspect, interacting with the fourth base station for the configuration information of the discontinuous data transmission parameter further includes: activating the configuration information of the discontinuous data transmission parameter which is suggested.

In conjunction with the fifth aspect or the first possible implementation of the fifth aspect, in a thirteenth possible implementation of the fifth aspect, the information interacting method further includes: transmitting third data to a user equipment UE, where the third data includes the configuration information of the discontinuous data transmission parameter of the third base station and/or the fourth base station, so that the UE performs measurement and/or data transmission according to at least the third data.

In conjunction with the thirteenth possible implementation of the fifth aspect, in a fourteenth possible implementation of the fifth aspect, transmitting the third data to the user equipment UE includes: transmitting the third data to the UE by at least one of broadcast, an RRC special signaling, a media access control control element (MACCE) and a physical layer command.

In conjunction with any one of the fifth aspect to the fourteenth possible implementation of the fifth aspect, in a fifteenth possible implementation of the fifth aspect, the configuration information of the discontinuous data transmission parameter includes at least one of configuration information of a discontinuous reception (DRX) parameter and configuration information of a discontinuous transmission (DTX) parameter.

In conjunction with the fifteenth possible implementation of the fifth aspect, in a sixteenth possible implementation of the fifth aspect, the configuration information of the DRX parameter is DRX configuration information of a user equipment (UE) for a cell, or DRX configuration information based on the configuration information of the discontinuous transmission DTX parameter.

In conjunction with the sixteenth possible implementation of the fifth aspect, in a seventeenth possible implementation of the fifth aspect, the DRX configuration information of the UE on the cell is DRX configuration information of signaling radio bearer (SRB) of the UE on the cell, or DRX configuration information of data radio bearer (DRB) of the UE on the cell, or DRX configuration information of carried data distribution.

In conjunction with any one of the fifteenth possible implementation to the seventeenth possible implementation of the fifth aspect, in an eighteenth possible implementation of the fifth aspect, the configuration information of the DRX parameter includes at least one of configuration information of the DRX parameter in a time domain and configuration information of the DRX parameter in a frequency domain.

In conjunction with any one of the fifteenth possible implementation to the eighteenth possible implementation of the fifth aspect, in an nineteenth possible implementation of the fifth aspect, the discontinuous reception includes at least one of discontinuous reception performed by a UE and discontinuous reception performed by a base station.

In conjunction with the fifteenth possible implementation of the fifth aspect, in an twentieth possible implementation of the fifth aspect, the DTX parameter is a DTX parameter on a base station level or a DTX parameter on a UE level.

In conjunction with the fifteenth possible implementation of the fifth aspect or the twentieth possible implementation of the fifth aspect, in a twenty-first possible implementation of the fifth aspect, the configuration information of the DTX parameter includes at least one of configuration information of the DRX parameter in a time domain and configuration information of the DRX parameter in a frequency domain.

In conjunction with the fifteenth possible implementation of the fifth aspect, the twentieth possible implementation of the fifth aspect, or the twenty-first possible implementation of the fifth aspect, in a twenty-second possible implementation of the fifth aspect, the discontinuous transmission includes at least one of discontinuous transmission performed by a base station and discontinuous transmission performed by a UE.

In conjunction with the sixth possible implementation of the fifth aspect, in a twenty-third possible implementation of the fifth aspect, the first request information is a handover request for the UE, in a case that the method is applied to a handover process; and the first request information is a data distribution request for the UE, in a case that the method is applied to a setup process of a data distribution channel.

According to a sixth aspect of an embodiment of the disclosure, it is provided an information interacting method performed by a fourth base station, including: interacting with a third base station for configuration information of a discontinuous data transmission parameter, so that a base station side performs at least one of scheduling and mobility management on a user equipment, where the base station side includes at least one of the third base station and the fourth base station.

In conjunction with the sixth aspect, in a first possible implementation of the sixth aspect, interacting with the third base station for the configuration information of the discontinuous data transmission parameter is applied to a handover process, a setup process of a data distribution channel, a setup process of a base station interface, or an update process of base station configuration.

In conjunction with the first possible implementation of the sixth aspect, in a second possible implementation of the sixth aspect, interacting with the third base station for the configuration information of the discontinuous data transmission parameter includes: transmitting to the third base station configuration information of the discontinuous data transmission parameter of the fourth base station.

In conjunction with the second possible implementation of the sixth aspect, in a third possible implementation of the sixth aspect, interacting with the third base station for the configuration information of the discontinuous data transmission parameter further includes: receiving acknowledgment information returned by the third base station.

In conjunction with the second possible implementation of the sixth aspect or the third possible implementation of the sixth aspect, in a fourth possible implementation of the sixth aspect, interacting with the third base station for the configuration information of the discontinuous data transmission parameter further includes: receiving configuration information of the discontinuous data transmission parameter of the third base station, and/or receiving configuration information of the discontinuous data transmission parameter that the third base station suggests the fourth base station using.

In conjunction with the fourth possible implementation of the sixth aspect, in a fifth possible implementation of the sixth aspect, the configuration information of the discontinuous data transmission parameter of the third base station and/or the configuration information of the discontinuous data transmission parameter that the third base station suggests the fourth base station using is carried by the acknowledgment information.

In conjunction with any one of the second possible implementation to the fifth possible implementation of the sixth aspect, in a sixth possible implementation of the sixth aspect, interacting with the third base station for the configuration information of the discontinuous data transmission parameter further includes: receiving first request information initiated by the third base station before transmitting to the third base station the configuration information of the discontinuous data transmission parameter of the fourth base station, where the first request information is configured to request the fourth base station to transmit the configuration information of the discontinuous data transmission parameter of the fourth base station.

In conjunction with the fourth possible implementation of the sixth aspect, in a seventh possible implementation of the sixth aspect, interacting with the third base station for the configuration information of the discontinuous data transmission parameter further includes: initiating second request information before receiving the configuration information of the discontinuous data transmission parameter of the third base station and/or the configuration information of the discontinuous data transmission parameter that the third base station suggests the fourth base station using, where the second request information is configured to request the third base station to transmit the configuration information of the discontinuous data transmission parameter of the third base station and/or transmit to the fourth base station the configuration information of the discontinuous data transmission parameter suggested to be used by the fourth base station.

In conjunction with the first possible implementation of the sixth aspect, in an eighth possible implementation of the sixth aspect, interacting with the third base station for the configuration information of the discontinuous data transmission parameter includes: transmitting to a third party device configuration information of the discontinuous data transmission parameter of the fourth base station.

In conjunction with the eighth possible implementation of the sixth aspect, in a ninth possible implementation of the sixth aspect, interacting with the third base station for the configuration information of the discontinuous data transmission parameter further includes: receiving first request information initiated by the third base station and forwarded by the third party device before transmitting to the third party device the configuration information of the discontinuous data transmission parameter of the fourth base station, where the first request information is at least configured to request the fourth base station to transmit the configuration information of the discontinuous data transmission parameter of the fourth base station.

In conjunction with the eighth possible implementation of the sixth aspect or the ninth possible implementation of the sixth aspect, in a tenth possible implementation of the sixth aspect, interacting with the third base station for the configuration information of the discontinuous data transmission parameter further includes: receiving second data from the third party device; the second data from the third party device includes at least one of: the configuration information of the discontinuous data transmission parameter of the third base station which is forwarded by the third party device; the configuration information of the discontinuous data transmission parameter that the third base station suggests the fourth base station using and which is forwarded by the third party device; and the configuration information of the discontinuous data transmission parameter that the third party device suggests the fourth base station using.

In conjunction with the tenth possible implementation of the sixth aspect, in an eleventh possible implementation of the sixth aspect, interacting with the third base station for the configuration information of the discontinuous data transmission parameter further includes: transmitting second request to the third party device before receiving the second data from the third party device, where the second request information is forwarded to the third base station by the third party device, and the second request information is configured to request the third base station to transmit the configuration information of the discontinuous data transmission parameter of the third base station and/or transmit the configuration information of the discontinuous data transmission parameter which is suggested to be used by the fourth base station.

In conjunction with the fourth possible implementation of the sixth aspect or the tenth possible implementation of the sixth aspect, in a twelfth possible implementation of the sixth aspect, interacting with the third base station for the configuration information of the discontinuous data transmission parameter further includes: activating the configuration information of the discontinuous data transmission parameter which is suggested.

In conjunction with the tenth possible implementation of the sixth aspect or the eleventh possible implementation of the sixth aspect, in a thirteenth possible implementation of the sixth aspect, interacting with the third base station for the configuration information of the discontinuous data transmission parameter further includes: transmitting to the third party device the configuration information of the discontinuous data transmission parameter which is suggested to be used by the third base station, so that the third party device forwards the configuration information of the discontinuous data transmission parameter to the third base station.

In conjunction with the sixth aspect or the first possible implementation of the sixth aspect, in a fourteenth possible implementation of the sixth aspect, the information interacting method further includes:

transmitting third data to a user equipment UE, where the third data includes configuration information of the discontinuous data transmission parameter of the third base station and/or the fourth base station, so that the UE performs measurement and/or data transmission according to at least the third data.

In conjunction with the fourteenth possible implementation of the sixth aspect, in a fifteenth possible implementation of the sixth aspect, transmitting the third data to the user equipment UE includes: transmitting the third data to the UE by at least one of broadcast, an RRC special signaling, a media access control control element (MACCE), and a physical layer command.

In conjunction with any one of the sixth aspect to the fifteenth possible implementation of the sixth aspect, in a sixteenth possible implementation of the sixth aspect, the configuration information of the discontinuous data transmission parameter includes at least one of configuration information of a discontinuous reception DRX parameter and configuration information of a discontinuous transmission (DTX) parameter.

In conjunction with the sixteenth possible implementation of the sixth aspect, in a seventeenth possible implementation of the sixth aspect, the configuration information of the DRX parameter is DRX configuration information of a user equipment (UE) for a cell, or DRX configuration information based on the configuration information of the discontinuous transmission DTX parameter.

In conjunction with the seventeenth possible implementation of the sixth aspect, in an eighteenth possible implementation of the sixth aspect, the DRX configuration information of the UE on the cell is DRX configuration information of signaling radio bearer (SRB) of the UE on the cell, or DRX configuration information of data radio bearer (DRB) of the UE on the cell, or DRX configuration information of carried data distribution.

In conjunction with any one of the sixteenth possible implementation to the eighteenth possible implementation of the sixth aspect, in a nineteenth possible implementation of the sixth aspect, the configuration information of the DRX parameter includes at least one of configuration information of the DRX parameter in a time domain and configuration information of the DRX parameter in a frequency domain.

In conjunction with any one of the sixteenth possible implementation to the nineteenth possible implementation of the sixth aspect, in a twentieth possible implementation of the sixth aspect, the discontinuous reception includes at least one of discontinuous reception performed by a UE and discontinuous reception performed by a base station.

In conjunction with the sixteenth possible implementation of the sixth aspect, in a twenty-first possible implementation of the sixth aspect, the DTX parameter is a DTX parameter on a base station level or a DTX parameter on a UE level.

In conjunction with the sixteenth possible implementation of the sixth aspect or the twenty-first possible implementation of the sixth aspect, in a twenty-second possible implementation of the sixth aspect, the configuration information of the DTX parameter includes at least one of configuration information of the DRX parameter in a time domain and configuration information of the DRX parameter in a frequency domain.

In conjunction with the sixteenth possible implementation of the sixth aspect, the twenty-first possible implementation of the sixth aspect or the twenty-second possible implementation of the sixth aspect, in a twenty-third possible implementation of the sixth aspect, the discontinuous transmission includes at least one of discontinuous transmission performed by a base station and discontinuous transmission performed by a UE.

In conjunction with the sixth possible implementation of the sixth aspect, in a twenty-fourth possible implementation of the sixth aspect, the first request information is a handover request for the UE, in a case that the method is applied to a handover process; and the first request information is a data distribution request for the UE, in a case that the method is applied to a setup process of a data distribution channel.

According to a seventh aspect of an embodiment of the disclosure, it is provided an information interacting method performed by a user equipment (UE), including:

receiving third data, where the third data includes configuration information of a discontinuous data transmission parameter of a third base station and/or a fourth base station, so that the UE performs measurement and/or data transmission according to at least the third data.

In conjunction with a sixth possible implementation of the seventh aspect, in a first possible implementation of the seventh aspect of the seventh aspect, the information interacting method further includes:

reporting, by the UE, second instruction information to the third base station and/or the fourth base station, where the second instruction information is configured to request configuring configuration information of the discontinuous data transmission parameter tending to be uniform.

According to an eighth aspect of an embodiment of the disclosure, it is provided a residing method, including: transmitting indication information to a user equipment (UE), where the indication information is configured to indicate at least one of: whether the UE in an idle state and/or in a connection state being able to reside in this cell, a reside-able object in which the UE in the idle state and/or in the connection state is able to reside, a non-reside-able object in which the UE in the idle state and/or in the connection state is unable to reside, and size and type of a cell, so that the UE resides based on the indication information.

In conjunction with the eighth aspect, in a first possible implementation, the indication information is further configured to carry priority information of the reside-able object.

In conjunction with the first possible implementation of the eighth aspect, in a second possible implementation, the priority information is characterized by a rank of the reside-able object.

In conjunction with the eighth aspect, the first possible implementation of the eighth aspect or the second possible implementation of the eighth aspect, in a third possible implementation, the reside-able object includes at least one of a reside-able cell and a reside-able base station, and the non-reside-able object includes at least one of a non-reside-able cell and a non-reside-able base station.

In conjunction with the eighth aspect, in a fourth possible implementation, the reside-able base station is an alternative base station which is able to act as a first base station.

In conjunction with the eighth aspect, in a fifth possible implementation, transmitting the indication information to the UE includes: transmitting the indication information to the UE by at least one of broadcast, an RRC special signaling, a media access control control element (MACCE), and a physical layer command.

According to a ninth aspect of an embodiment of the disclosure, it is provided a residing method performed by a user equipment UE, including:

receiving indication information transmitted by a base station side, where the indication information is configured to indicate at least one of: whether the UE in an idle state and/or in a connection state being able to reside in this cell, a reside-able object in which the UE in the idle state and/or in the connection state is able to reside, a non-reside-able object in which the UE in the idle state and/or in the connection state is unable to reside, and size and type of a cell; and residing based on the indication information.

In conjunction with the ninth aspect, in a first possible implementation, the indication information is further configured to carry priority information of the reside-able object.

In conjunction with the first possible implementation of the ninth aspect, in a second possible implementation, the priority information is characterized by a rank of the reside-able object.

In conjunction with the ninth aspect, in a third possible implementation, the reside-able object includes a reside-able cell and/or a reside-able base station, and the non-reside-able object includes a non-reside-able cell and/or a non-reside-able base station.

In conjunction with the third possible implementation of the ninth aspect, in a fourth possible implementation, the reside-able base station is an alternative base station which is able to act as a first base station.

In conjunction with the ninth aspect, in a fifth possible implementation, receiving the indication information transmitted by the base station side includes: receiving the indication information transmitted by at least one of broadcast, an RRC special signaling, a media access control control element (MACCE), and a physical layer command.

According to a tenth aspect of an embodiment of the disclosure, it is provided a measuring apparatus, including at least a first CPU and a first transmitter, where the first CPU is configured to configure measurement configuration information of a user equipment UE, where the measurement configuration information includes at least a measurement report triggering condition for a reference cell, so that the UE reports a measurement result if the measurement report triggering condition for the reference cell is met; and the first transmitter is configured to transmit the measurement configuration information.

In conjunction with the tenth aspect, in a first possible implementation, the measurement report triggering condition for the reference cell includes at least one of a first triggering condition and a second triggering condition;

the first triggering condition includes: signal quality of a neighbor cell being higher than signal quality of the reference cell by a threshold; and the second triggering condition includes: signal quality of the reference cell being lower than a first absolute threshold and signal quality of a neighbor cell being higher than a second absolute threshold.

In conjunction with the first possible implementation of the tenth aspect, in a second possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, any cell in a set of reference cells, all cells in the set of reference cells, a cell meeting a first preset condition in the set of reference cells, and a specified cell.

In conjunction with the first possible implementation of the tenth aspect or the second possible implementation of the tenth aspect, in a third possible implementation, the first CPU is further configured to configure a cell keeping wireless communication with the UE to be a primary cell, where the primary cell acts as the reference cell, so that the UE reports the measurement result if signal quality of a neighbor cell is higher than signal quality of the primary cell by a threshold or if signal quality of the primary cell is lower than a first absolute threshold and signal quality of a neighbor cell is higher than a second absolute threshold.

In conjunction with the tenth aspect, in a fourth possible implementation, the measurement report triggering condition for the reference cell includes at least one of a third triggering condition, a fourth triggering condition and a fifth triggering condition;

the third triggering condition includes: signal quality of the reference cell being higher than a third absolute threshold;

the fourth triggering condition includes: signal quality of the reference cell being lower than a fourth absolute threshold; and the fifth triggering condition includes: signal quality of a neighbor cell being higher than signal quality of the reference cell by a threshold.

In conjunction with the tenth aspect, in a fifth possible implementation, the measurement report triggering condition for the reference cell includes a sixth triggering condition: periodically reporting the measurement result for the reference cell.

In conjunction with the second possible implementation of the tenth aspect, in a sixth possible implementation, the cell of the first base station includes at least one of: a primary cell of the first base station, and a cell, which keeps timing alignment with the UE, of the first base station.

In conjunction with the second possible implementation of the tenth aspect, in a seventh possible implementation, the cell of the second base station includes at least one of: a primary cell of the second base station, and a cell, which keeps timing alignment with the UE, of the second base station.

In conjunction with any one of the first possible implementation to the seventh possible implementation of the tenth aspect, in an eighth possible implementation, the neighbor cell includes at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

In conjunction with the eighth possible implementation of the tenth aspect, in a ninth possible implementation, the primary cell is a cell which meets a second preset condition, where the second preset condition includes at least one of: being subjected to wireless link monitor performed by the UE, transmitting an RRC message to the UE, transmitting a packet after RRC message processing to the UE, and generating an RRC message.

In conjunction with the second possible implementation of the tenth aspect, in a tenth possible implementation, the first preset condition includes: signal quality being the highest, or signal quality being the lowest, or signal quality being in top N, or signal quality being in last M, or signal quality being the X-th high or signal quality being the Y-th low, where N, M, X and Y are natural numbers.

In conjunction with the tenth possible implementation of the tenth aspect, in an eleventh possible implementation, the cell which meets the first preset condition is selected periodically according to a preset periodicity, and/or the cell which meets the first preset condition is selected when a selection triggering condition is met.

In conjunction with the eleventh possible implementation of the tenth aspect, in a twelfth possible implementation, the periodicity includes at least one of: a periodicity based on the UE, a periodicity based on the measurement report triggering condition, a periodicity based on a cell, and a periodicity based on cell frequency.

In conjunction with the tenth possible implementation of the tenth aspect, in a thirteenth possible implementation, the selection triggering condition at least includes: a fluctuation of the measurement result exceeding a threshold.

In conjunction with the thirteenth possible implementation of the tenth aspect, in a fourteenth possible implementation, the fluctuation includes at least one of a first fluctuation and a second fluctuation.

In conjunction with the fourteenth possible implementation of the tenth aspect, in a fifteenth possible implementation, the first fluctuation includes: a current measurement result fluctuating compared with a history measurement result for a particular cell or any cell in a set; and the second fluctuation includes at least one of: a compare value between current measurement results of any two cells in a same set fluctuating, a compare value between current measurement results of two selected cells in a same set fluctuating, and a compare value between current measurement results of a particular cell and any another cell in a same set fluctuating.

In conjunction with any one of the tenth aspect and the first possible implementation to the fifteenth possible implementation of the tenth aspect, in a sixteenth possible implementation, the first CPU is further configured to configure a report object to which the measurement result of the UE is reported, so that the UE reports the measurement result to the corresponding report object if the measurement report triggering condition for the reference cell is met.

According to an eleventh aspect of an embodiment of the disclosure, it is provided a measuring apparatus, including at least a first transceiver and a second CPU, where the first transceiver is configured to receive measurement configuration information configured by a base station side, and to report a measurement result if a measurement report triggering condition for a reference cell is met, where the measurement configuration information includes at least the measurement report triggering condition for the reference cell; and the second CPU is configured to determine whether the measurement report triggering condition for the reference cell is met.

In conjunction with the eleventh aspect, in a first possible implementation, the measurement report triggering condition for the reference cell includes at least one of a first triggering condition and a second triggering condition;

the first triggering condition includes: signal quality of a neighbor cell being higher than signal quality of the reference cell by a threshold; and the second triggering condition includes: signal quality of the reference cell being lower than a first absolute threshold and signal quality of a neighbor cell being higher than a second absolute threshold.

In conjunction with the first possible implementation of the eleventh aspect, in a second possible implementation, the reference cell includes at least one of: a cell of a first base station, a cell of a second base station, a cell which is the only one that keeps wireless communication with the UE, a cell keeping uplink wireless communication with the UE, a cell keeping downlink wireless communication with the UE, any cell in a set of reference cells, all cells in the set of reference cells, a cell meeting a first preset condition in the set of reference cells, and a specified cell.

In conjunction with the eleventh aspect or the first possible implementation of the eleventh aspect, in a third possible implementation, the second CPU is further configured to instruct the first transceiver to report the measurement result if signal quality of a neighbor cell is higher than signal quality of a primary cell configured by the base station side by a threshold or if signal quality of a primary cell configured by the base station side is lower than a first absolute threshold and signal quality of a neighbor cell is higher than a second absolute threshold;

the primary cell acts as the reference cell, and the primary cell is a cell keeping wireless communication with the UE.

In conjunction with the eleventh aspect, in a fourth possible implementation, the measurement report triggering condition for the reference cell includes at least one of a third triggering condition, a fourth triggering condition and a fifth triggering condition;

the third triggering condition includes: signal quality of the reference cell being higher than a third absolute threshold;

the fourth triggering condition includes: signal quality of the reference cell being lower than a fourth absolute threshold; and the fifth triggering condition includes: signal quality of a neighbor cell being higher than signal quality of the reference cell by a threshold.

In conjunction with the eleventh aspect, in a fifth possible implementation, the measurement report triggering condition for the reference cell includes a sixth triggering condition: periodically reporting the measurement result for the reference cell.

In conjunction with the second possible implementation of the eleventh aspect, in a sixth possible implementation, the cell of the first base station includes at least one of: a primary cell of the first base station, and a cell, which keeps timing alignment with the UE, of the first base station.

In conjunction with the second possible implementation of the eleventh aspect, in a seventh possible implementation, the cell of the second base station includes at least one of: a primary cell of the second base station, and a cell, which keeps timing alignment with the UE, of the second base station.

In conjunction with the first possible implementation to the seventh possible implementation of the eleventh aspect, in an eighth possible implementation, the neighbor cell includes at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

In conjunction with the eighth possible implementation of the eleventh aspect, in a ninth possible implementation, the primary cell is a cell which meets a second preset condition, where the second preset condition includes at least one of: being subjected to wireless link monitor performed by the UE, transmitting an RRC message to the UE, transmitting a packet after RRC message processing to the UE, and generating an RRC message.

In conjunction with the second possible implementation of the eleventh aspect, in a tenth possible implementation, the first preset condition includes: signal quality being the highest, or signal quality being the lowest, or signal quality being in top N, or signal quality being in last M, or signal quality being the X-th high or signal quality being the Y-th low, where N, M, X and Y are natural numbers.

In conjunction with the tenth possible implementation of the eleventh aspect, in an eleventh possible implementation, the cell which meets the first preset condition is selected periodically according to a preset periodicity, and/or the cell which meets the first preset condition is selected when a selection triggering condition is met.

In conjunction with the eleventh possible implementation of the eleventh aspect, in a twelfth possible implementation, the periodicity includes at least one of: a periodicity based on the UE, a periodicity based on the measurement report triggering condition, a periodicity based on a cell, and a periodicity based on cell frequency.

In conjunction with the twelfth possible implementation of the eleventh aspect, in a thirteenth possible implementation, the selection triggering condition at least includes: a fluctuation of the measurement result exceeding a threshold.

In conjunction with the thirteenth possible implementation of the eleventh aspect, in a fourteenth possible implementation, the fluctuation includes at least one of a first fluctuation and a second fluctuation.

In conjunction with the fourteenth possible implementation of the eleventh aspect, in a fifteenth possible implementation, the first fluctuation includes: a current measurement result fluctuating compared with a history measurement result for a particular cell or any cell in a set; and the second fluctuation includes at least one of: a compare value between current measurement results of any two cells in a same set fluctuating, a compare value between current measurement results of two selected cells in a same set fluctuating, and a compare value between current measurement results of a particular cell and any another cell in a same set fluctuating.

In conjunction with any one of the eleventh aspect and the first possible implementation to the fifteenth possible implementation of the eleventh aspect, in a sixteenth possible implementation, the first transceiver is further configured to receive a report object, which is configured by the base station side, to which the measurement result is reported, and reporting the measurement result includes reporting the measurement result to the corresponding report object.

In conjunction with the tenth possible implementation of the eleventh aspect, in a seventeenth possible implementation, the primary cell includes a cell having a physical uplink control channel in uplink.

According to a twelfth aspect of an embodiment of the disclosure, it is provided a measuring apparatus, including at least a third CPU and a storage, where the third CPU performs at least the following step by executing a software program stored in the storage and invoking data stored in the storage:

configuring a report object to which a measurement result of a user equipment UE is reported, so that the UE reports the measurement result to the corresponding report object.

According to a thirteenth aspect of an embodiment of the disclosure, it is provided a measuring apparatus, including at least:

a second transceiver, configured to receive a report object, which is configured by a base station side, to which a measurement result is reported, and to report the measurement result to the corresponding report object.

According to a fourteenth aspect of an embodiment of the disclosure, it is provided an information interacting apparatus, including at least a third transceiver, where the third transceiver is configured to interact with a fourth base station for configuration information of a discontinuous data transmission parameter, so that a base station side performs at least one of scheduling and mobility management on a user equipment, where the base station side includes at least one of a third base station and the fourth base station.

In conjunction with the fourteenth aspect, in a first possible implementation, interacting with the fourth base station for the configuration information of the discontinuous data transmission parameter includes: receiving configuration information of the discontinuous data transmission parameter of the fourth base station transmitted by the fourth base station.

In conjunction with the first possible implementation of the fourteenth aspect, in a second possible implementation, interacting with the fourth base station for the configuration information of the discontinuous data transmission parameter further includes: returning acknowledgment information.

In conjunction with the second possible implementation of the fourteenth aspect, in a third possible implementation, interacting with the fourth base station for the configuration information of the discontinuous data transmission parameter further includes: transmitting to the fourth base station configuration information of the discontinuous data transmission parameter of the third base station, and/or transmitting to the fourth base station configuration information of the discontinuous data transmission parameter which is suggested to be used by the fourth base station.

In conjunction with the third possible implementation of the fourteenth aspect, in a fourth possible implementation, the configuration information of the discontinuous data transmission parameter of the third base station and/or the configuration information of the discontinuous data transmission parameter which is suggested to be used by the fourth base station is carried by the acknowledgment information.

In conjunction with the fourteenth aspect, in a fifth possible implementation, the third transceiver is further configured to transmit third data to a user equipment UE, where the third data includes the configuration information of the discontinuous data transmission parameter of the third base station and/or the fourth base station, so that the UE performs measurement and/or data transmission according to at least the third data.

In conjunction with the fifth possible implementation of the fourteenth aspect, in a sixth possible implementation, the third transceiver transmits the third data to the UE by at least one of broadcast, an RRC special signaling, a media access control control element MACCE and a physical layer command.

In conjunction with any one of the fourteenth aspect and the first possible implementation to the sixth possible implementation of the thirteenth aspect, in a seventh possible implementation, the configuration information of the discontinuous data transmission parameter includes at least one of configuration information of a discontinuous reception (DRX) parameter and configuration information of a discontinuous transmission (DTX) parameter.

In conjunction with the seventh possible implementation of the fourteenth aspect, in an eighth possible implementation, the configuration information of the DRX parameter is DRX configuration information of a user equipment (UE) for a cell, or DRX configuration information based on the configuration information of the discontinuous transmission (DTX) parameter.

In conjunction with the eighth possible implementation of the fourteenth aspect, in a ninth possible implementation, the DRX configuration information of the UE on the cell is DRX configuration information of signaling radio bearer (SRB) of the UE on the cell, or DRX configuration information of data radio bearer (DRB) of the UE on the cell, or DRX configuration information of carried data distribution.

In conjunction with any one of the seventh possible implementation to the ninth possible implementation of the fourteenth aspect, in a tenth possible implementation, the configuration information of the DRX parameter includes at least one of configuration information of the DRX parameter in a time domain and configuration information of the DRX parameter in a frequency domain.

In conjunction with the seventh possible implementation of the fourteenth aspect, in an eleventh possible implementation, the configuration information of the DTX parameter includes at least one of configuration information of the DRX parameter in a time domain and configuration information of the DRX parameter in a frequency domain.

According to a fifteenth aspect of an embodiment of the disclosure, it is provided an information apparatus, including at least a fourth transceiver, where the fourth transceiver is configured to:

interact with a third base station for configuration information of a discontinuous data transmission parameter, so that a base station side performs at least one of scheduling and mobility management on a user equipment, where the base station side includes at least one of the third base station and a fourth base station.

In conjunction with the fifteenth aspect, in a first possible implementation, interacting with the third base station for the configuration information of the discontinuous data transmission parameter includes: transmitting to the third base station configuration information of the discontinuous data transmission parameter of the fourth base station.

In conjunction with the first possible implementation of the fifteenth aspect, in a second possible implementation, interacting with the third base station for the configuration information of the discontinuous data transmission parameter further includes: receiving acknowledgment information returned by the third base station.

In conjunction with the first possible implementation of the fifteenth aspect or the second possible implementation of the fifteenth aspect, in a third possible implementation, interacting with the third base station for the configuration information of the discontinuous data transmission parameter further includes: receiving configuration information of the discontinuous data transmission parameter of the third base station, and/or receiving configuration information of the discontinuous data transmission parameter that the third base station suggests the fourth base station using.

In conjunction with the third possible implementation of the fifteenth aspect, in a fourth possible implementation, the configuration information of the discontinuous data transmission parameter of the third base station and/or the configuration information of the discontinuous data transmission parameter that the third base station suggests the fourth base station using is carried by the acknowledgment information.

In conjunction with the fifteenth aspect or the first possible implementation of the fifteenth aspect, in a fifth possible implementation, the fourth transceiver is further configured to:

transmit third data to a user equipment (UE), where the third data includes configuration information of the discontinuous data transmission parameter of the third base station and/or the fourth base station, so that the UE performs measurement and/or data transmission according to at least the third data.

In conjunction with the fifth possible implementation of the fifteenth aspect, in a sixth possible implementation, the fourth transceiver transmits the third data to the UE by at least one of broadcast, an RRC special signaling, a media access control control element (MACCE), and a physical layer command.

In conjunction with any one of the fifteenth aspect and the first possible implementation to the sixth possible implementation of the fifteenth aspect, in a seventh possible implementation, the configuration information of the discontinuous data transmission parameter includes at least one of configuration information of a discontinuous reception (DRX) parameter and configuration information of a discontinuous transmission (DTX) parameter.

In conjunction with the seventh possible implementation of the fifteenth aspect, in an eighth possible implementation, the configuration information of the DRX parameter is DRX configuration information of a user equipment (UE) for a cell, or DRX configuration information based on the configuration information of the discontinuous transmission DTX parameter.

In conjunction with the eighth possible implementation of the fifteenth aspect, in a ninth possible implementation, the DRX configuration information of the UE on the cell is DRX configuration information of signaling radio bearer (SRB) of the UE on the cell, or DRX configuration information of data radio bearer (DRB) of the UE on the cell, or DRX configuration information of carried data distribution.

In conjunction with the seventh possible implementation to the ninth possible implementation of the fifteenth aspect, in a tenth possible implementation, the configuration information of the DRX parameter includes at least one of configuration information of the DRX parameter in a time domain and configuration information of the DRX parameter in a frequency domain.

In conjunction with the tenth possible implementation of the fifteenth aspect, in an eleventh possible implementation, the configuration information of the DTX parameter includes at least one of configuration information of the DRX parameter in a time domain and configuration information of the DRX parameter in a frequency domain.

According to a sixteenth aspect of an embodiment of the disclosure, it is provided an information interacting apparatus, including a first receiver, where the first receiver is configured to receive third data, where the third data includes configuration information of a discontinuous data transmission parameter of a third base station and/or a fourth base station, so that measurement and/or data transmission is performed according to at least the third data.

According to a seventeenth aspect of an embodiment of the disclosure, it is provided a residing apparatus, including at least a second transmitter, where the second transmitter is configured to transmit indication information to a user equipment (UE), where the indication information is configured to indicate at least one of: whether the UE in an idle state and/or in a connection state being able to reside in this cell, a reside-able object in which the UE in the idle state and/or in the connection state is able to reside, a non-reside-able object in which the UE in the idle state and/or in the connection state is unable to reside, and size and type of a cell, so that the UE resides based on the indication information.

In conjunction with the seventeenth aspect, in a first possible implementation, the indication information is further configured to carry priority information of the reside-able object.

In conjunction with the seventeenth aspect or the first possible implementation of the seventeenth aspect, in a second possible implementation, the reside-able object includes at least one of a reside-able cell and a reside-able base station, and the non-reside-able object includes at least one of a non-reside-able cell and a non-reside-able base station.

In conjunction with the second possible implementation of the seventeenth aspect, the reside-able base station is an alternative base station which is able to act as a first base station.

According to an eighteenth aspect of an embodiment of the disclosure, it is provided a residing apparatus, including at least:

a second receiver, configured to receive indication information transmitted by a base station side, where the indication information is configured to indicate at least one of: whether a UE in an idle state and/or in a connection state being able to reside in this cell, a reside-able object in which the UE in the idle state and/or in the connection state is able to reside, a non-reside-able object in which the UE in the idle state and/or in the connection state is unable to reside, and size and type of a cell; and a fourth CPU, configured to reside based on the indication information.

In conjunction with the eighteenth aspect, in a first possible implementation, the indication information is further configured to carry priority information of the reside-able object.

In conjunction with the eighteenth aspect or the first possible implementation of the eighteenth aspect, in a second possible implementation, the reside-able object includes at least one of a reside-able cell and a reside-able base station, and the non-reside-able object includes at least one of a non-reside-able cell and a non-reside-able base station.

In conjunction with the second possible implementation of the eighteenth aspect, in a third possible implementation, the reside-able base station is an alternative base station which is able to act as a first base station.

BRIEF DESCRIPTION OF THE DRAWINGS

The drawings to be used in the description of the embodiments or the prior art are described briefly as follows, to more clearly describe the technical solutions according to the embodiments of the present disclosure or according to the prior art. It is apparent that the drawings in the following description are only some embodiments of the present disclosure. Other drawings may be obtained by those skilled in the art according to these drawings without any creative work.

FIG. 1 is a schematic diagram of measurement configuration information according to an embodiment of the disclosure;

FIG. 2a is a flow chart of interacting between a base station side and a UE side according to an embodiment of the disclosure;

DETAILED DESCRIPTION OF EMBODIMENTS

Figure 2B:
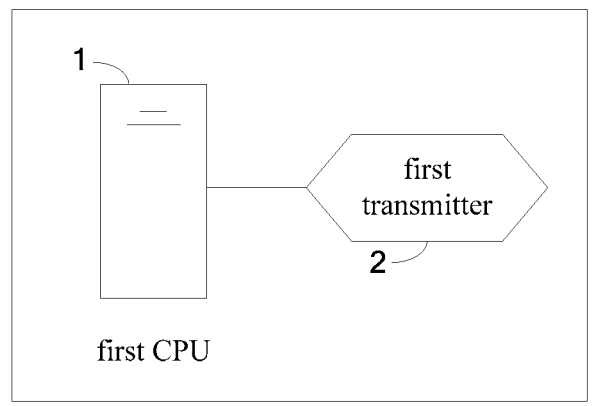
FIG. 2b is a schematic structural diagram of a measuring apparatus according to an embodiment of the disclosure.

The technical solutions according to the embodiments of the present disclosure are described clearly and completely as follows in conjunction with the drawings of the embodiments of the present disclosure. It is obvious that the described embodiments are only a few but not all of embodiments of the present disclosure. All other embodiments obtained by those skilled in the art based on these embodiments of the present disclosure without any creative work belong to the scope of protection of the present disclosure.

With the development of the mobile communication technology and the large-scale deployment of the 3G network/LTE, services with high rate and broad bandwidth bring varied application experiences to people. As application services gradually increases, the requirement on the capacity of the network increases. In order to further improve the capacity of the network, the network architecture evolves from a homogeneous network to a heterogeneous network. There are usually multiple access points in the coverage of a macro base station access point. These access points may be a Pico base station (Pico), a Femto base station (Femto), a low mobility base station (LoMo), a local wireless access point (AP), a low power emission node (LPN), a remote radio head (RRH), etc. A UE may keep communication with the above multiple access points in a manner of carrier aggregation. From a UE side, multiple cells communicate with the UE. The cell of the base station that the UE initially accesses is considered as a primary cell by default in the conventional condition. One or more secondary cells may also be configured to provide service for the UE after the UE accesses the primary cell. Carriers of each of the cells are different, which is called as carrier aggregation.

These access points are connected to one base station through optical fiber as discussed in the conventional condition. With the evolution of the network, the multiple access points are not connected to one base station, that is, the multiple access points communicating with the UE may belong to different base stations. These base stations are connected with each other through a non-ideal backhaul network (backhaul). In this way, the UE may be connected to two types of base stations: a first base station and a second base station.

It should be noted that, in the disclosure, the first base station may also be referred to as a first type of base station, a primary base station (MeNB) of a UE, an anchor base station or a virtual base station. The first base station may be responsible for ending S1-MME. The first base station may act as a mobility anchor oriented to a core network. The first base station may be a macro base station. The second base station is a base station which does not belong to the first type of base station. The second base station may also be referred to as a second type of base station or a secondary base station (SeNB) of a UE. The second base station may be a small base station (such as the above-mentioned Pico, Femto, LoMo, AP, LPN, RRH, etc., i.e., a small cell base station). The second base station may provide data distribution service for the UE. In addition, the second base station may be a first network node, and in this case, the base station that the first network node belongs to may be the first base station, which is not limited herein.

One UE may correspond to one or more secondary base stations. Therefore, the second base station in the disclosure may be understood as a collective name of base stations which do not belong to the first type of base station, but does not merely refer to a single second base station. The first base station and the second base station may provide split bearer services for the UE.

Since the UE may be connected to the first base station and the second base station as the evolution of the network, operations or processes originally applied to the case that multiple access points are connected to one base station have to be optimized as the evolution of the network.

For example, measurement mechanism involved in mobility management, aggregation cell management (addition/deletion/replacement), wireless resource management and interference coordination has to be optimized as the evolution of the network. It should be noted that in the disclosure, the aggregation cell may refer to a cell providing double connection service for the UE and or a cell providing split bearer service for the UE.

In order to effectively perform the mobility management, the aggregation cell management (addition/deletion/replacement), the wireless resource management or the interference coordination, a new cell may be added or a cell with low signal quality may be deleted in real time based on signal quality of the UE and the cell when the UE communicates with multiple cells. The conventional technology is obtained based on the fact that the UE has one primary cell, multiple secondary cells and multiple neighbor cells. In the conventional technology, both the primary cell and the secondary cells provide service to the UE, and are serving cells of the UE. The UE moves in the wireless network. In order to ensure the requirement on the wireless link quality and scheduling between the UE and the wireless network, the UE reports the quality of the downlink signal of each cell measured by the UE, so that the network side performs the mobility management. Currently, there are mainly two triggering mechanisms for the UE to report the signal quality, one is periodically measuring and reporting the measurement result, and another is reporting the measurement result by triggering of a measurement event. Both the periodical triggering and the triggering based on a measurement event are measurement report triggering conditions.

In the disclosure, the signal quality is not limited to the signal quality obtained from an RRC layer, but also includes the signal quality obtained by measuring from a lower layer or in a shorter periodicity.

The simple process of reporting the measurement result in the conventional LTE system is as follows.

A base station (eNB) transmits measurement configuration information to a UE. As shown in FIG. 1, in the measurement configuration information, each measurement is identified by a measurement identification (Measurement ID), and each measurement (or measurement ID) corresponds to a measurement object and a report configuration. Each measurement object has an individual measurement object identification (Object ID), and each report configuration corresponds to a report configuration identification (report conFIG. 1D). Each report configuration includes a report standard and a report format. The report standard can trigger a terminal to transmit a measurement report, that is, the report standard is a measurement report triggering condition. The report format describes content reported by the UE. In FIG. 1, the LTE carrier frequency represents a LTE carrier frequency, and the GERAN set of carrier frequencies represents the set of carrier frequencies of the GSM EDGE wireless access network.

After the UE obtains the above measurement configuration information, the UE reports a measurement result of a measuring object to the eNB if the measurement result meets the measurement report triggering condition.

There are six triggering events A1-A6 (i.e., measurement events) for the measurement report triggering condition used in the LTE system. That is, there are six event-based measurement report triggering conditions, which are Event A1 to Event A6 as follows.

Event A1: Serving becomes better than absolute threshold (event A1: the signal quality of a serving cell is higher than an absolute threshold).

Event A2: Serving becomes worse than absolute threshold (event A2: the signal quality of a serving cell is lower than an absolute threshold).

Event A3: Neighbour becomes amount of offset better than PCell (event A3: the sum of the signal quality of a neighbour cell and an offset value is higher than the signal quality of a primary cell).

Event A4: Neighbour becomes better than absolute threshold (event A4: the signal quality of a neighbour cell is higher a threshold).

Event A5: PCell becomes worse than abxolute threshold1 AND Neighbour becomes better than another absolute threshold2 (event A5: the signal quality of a primary cell is lower than a threshold 1 and the signal quality of a neighbour cell is higher than a threshold 2).

Event A6: Neighbour becomes amount of offset better than SCell (event A6: the sum of the signal quality of a neighbour cell and an offset value is higher the signal quality of a secondary cell).

A measurement event of an inter-system is identified by Bx, such as even B1, even B2.

A manner for the triggering based on the measurement event being optimized with the evolution of the network is described below.

Initially, the following cases are considered.

Case one: a first base station and a second base station are configured for the UE. The UE has only a single radio frequency ability, and the UE keeps a wireless connection with only the cell of the second base station.

Case two: the coverage of the cell of the first base station and the coverage of the cell of the second base station does not overlap with each other, and the UE can only receive signals from the cell of the second base station.

Case three: the UE has a double radio frequency ability, but there is no macro base station for the UE, or the first base station dose not provide wireless link service for the UE, or the UE can not receive signals from the cell of the first base station.

The primary cells in the conventional measurement events A3 and A5 are primary cells defaulted by the system, and the UE acquires information from the wireless link of the primary cell. However, in Case one to Case three, the UE can only receive the signal from the cell of the second base station, therefore, if the base station side configures measurement relating to event A3 and/or A5 for the UE, the UE can not trigger the corresponding measurement report.

In addition, there is also a Case four as follows.

Case four: in the conventional condition that multiple access points are connected to one base station, the UE only has one primary cell (Pcell), and the cell provides NAS mobility information to the UE during a process of switching/RRC connection setup/RRC resetup and the cell provides safety input during a process of switching/RRC resetup. Only the primary cell can provide information of an RRC layer (including the NAS mobility information and the safety input), and the primary cell issues the information to the UE by using an MAC layer and a physical layer of multiple servicing cell. Considering that the primary cell has the above important functions and the base station that the primary cell belongs to can obtain information of other serving cells in time, the UE only has to perform wireless link monitor on the primary cell, and the design by the system on the measurement mechanism focusing on the primary cell can meet the requirement on the performance of the network such as the mobility.

With the evolution of the network, the UE may keep connection with multiple base stations, and all cells of these base stations providing services to the UE may provide or transmit RRC messages to the UE and may also provide safety inputs respectively. In this case and in the network architecture, multiple cells whose function is similar to the primary cell under the carrier aggregation technology may provide service for the UE, and any base station may acquire information of cells of other base stations with experiencing a network path delay. Therefore, the various comparison processes based on the only one system-defaulted primary cell in the conventional measurement events A3 and A5 have to be optimized, otherwise the UE can not distinguish which cell is an appropriate primary cell. In addition, in order to optimize the performance of the mobility management performed on the UE by the network side, an enhanced measurement report triggering event has to be designed.

In view of this, it is provided a measuring method and a measuring apparatus according to embodiments of the disclosure.

The above measuring method is performed by a base station (a cell) or a UE. A process performed by the base station side (the cell) is described as follows. The process at least includes:

configuring measurement configuration information of a UE and transmitting the measurement configuration information.

In a case that the measuring method is performed by the UE, the corresponding process includes:

receiving measurement configuration information configured by a base station side, where the measurement configuration information at least includes a measurement report triggering condition for a reference cell; and reporting a measurement result if the measurement report triggering condition for the reference cell is met.

The above-mentioned measurement configuration information at least includes a measurement report triggering condition for the reference cell, so that the UE reports the measurement result if the measurement report triggering condition for the reference cell is met.

Specifically, the measurement result may include at least one of: signal quality of a neighbor cell whose signal quality is in top R, signal quality of a serving cell whose signal quality is in top S, and signal quality of a reference cell whose signal quality is in top T. R, S and T are natural numbers, and the values of R, S and T may be equal or unequal.

It should be noted that, the measurement configuration information may be configured by the first base station (or the cell of the first base station) or may be configured by the second base station (or the cell of the second base station). Generally, the measurement configuration information is generated by the first base station. After generating the measurement configuration information, the first base station may transmit the measurement configuration information to the UE. Alternatively, the first base station may transmit the measurement configuration information to the second base station, and the second base station issues the measurement configuration information to the UE. Therefore, if it is defined from a view of generating the measurement configuration information, the measurement configuration information is configured by the first base station (or the cell of the first base station); and if it is defined from a view of issuing the measurement configuration information, the measurement configuration information may be sometimes configured by the second base station (or the cell of the first base station). In particular cases, especially in a case that the UE can only receive the signal from the cell of the second base station, the measurement configuration information may be generated by the second base station, and then issued by the second base station.

FIG. 2a illustrates a flow of interacting between a base station side and a UE side, at least including S1 to S3 as follows.

In S1, the base station configures and transmits measurement configuration information of the UE.

In S2, the UE receives the measurement configuration information configured by the base station side.

In S3, the UE reports a measurement result if a measurement report triggering condition for a reference cell is met.

In the above embodiment, the reference cell and the measurement report triggering condition for the reference cell are introduced. Those of ordinary skilled in the art may configure the reference cell and/or configure ""the measurement report triggering condition for the reference cell", to make at least one of the above Case one to Case four be within the scope of triggering based on the measurement event, therefore, the optimization requirement arising with the evolution of the network is met.

Furthermore, there are at least two optimization ways. The first optimization way is to add a measurement report triggering condition for the reference cell on the basis of the conventional measurement report triggering condition. The second optimization way is to modify the conventional measurement report triggering condition to be a measurement report triggering condition for the reference cell. The descriptions thereof will be as follows.

In other embodiments of the disclosure, the measurement report triggering condition for the reference cell includes at least one of a first triggering condition and a second triggering condition.

The first triggering condition includes: signal quality of a neighbor cell being higher than signal quality of the reference cell by a threshold.

The second triggering condition includes: signal quality of the reference cell being lower than a first absolute threshold and signal quality of a neighbor cell being higher than a second absolute threshold.

In order to make at least one of the above Case one to Case four be within the scope of the triggering based on the measurement event, the reference cell may include a cell which is the only one that keeps wireless communication with the UE. In other case, the reference cell may include at least one of: a cell of the first base station, a cell of the second base station, a cell keeping uplink wireless communication with the UE, a cell keeping downlink wireless communication with the UE, any cell in a set of reference cells, all cells in the set of reference cells, an appropriate cell which is selected from the set of reference cells and meets a first preset condition, and a specified cell. The further explanation thereof will be described below.

It is mentioned above that there are two optimization ways to meet the optimization requirement arising with the evolution of the network. The two optimization ways for the first triggering condition and the second triggering condition are as follows.

In the first way, the conventional measurement events A3 and A5 are retained, and measurement events D3 and D5 are added. The measurement event D3 is the first triggering condition and the measurement event D5 is the second triggering condition. In this way, it may be compatible with the conventional measurement report triggering condition. That is, the measurement events include not only A1 to A6, but also D3 and D5. The base station may configure measurement for the UE as required in configuring.

In the second way, the conventional measurement events A3 and A5 are respectively optimized to be the first triggering condition and the second triggering condition. For example, in the conventional technology, PCell in the measurement events A3 and A5 can not be configured and is the system-defaulted primary cell.

In the embodiment, PCell in the measurement events A3 and A5 can be configured. The configured primary cell acts as the above reference cell. In this way, the conventional measurement events A3 and A5 may be respectively optimized to be the first triggering condition and the second triggering condition.

Those of ordinary skilled in the art may flexibly design how to configure the PCell in the measurement events A3 and A5 as required. For example, in order to make at least one of the above Case one to Case four be within the scope of the triggering based on the measurement event, the base station may configure the cell keeping wireless communication with the UE to be the primary cell (PCell).

In a case that the method is performed by the UE, the corresponding process includes: reporting the measurement result if the signal quality of a neighbor cell is higher than the signal quality of the primary cell configured by the base station side by a threshold or if the signal quality of the primary cell configured by the base station side is lower than a first absolute threshold and the signal quality of a neighbor cell is higher than a second absolute threshold.

The PCell in the conventional measurement events A3 and A5 may be modified to be the reference cell, and the reference cell is defined as above. In this way, the conventional measurement events A3 and A5 may be also respectively optimized to be the first triggering condition and the second triggering condition.

In addition to the measurement events A3 and A5, the triggering based on the measurement events A1, A2 and A6 may also be optimized with the evolution of the network.

For the optimization of the measurement events A1, A2 and A6, "the measurement report triggering condition for the reference cell" may include at least one of a third triggering condition, a fourth triggering condition and a fifth triggering condition.

The third triggering condition includes: signal quality of the reference cell being higher than a third absolute threshold.

The fourth triggering condition includes: signal quality of the reference cell being lower than a fourth absolute threshold.

The fifth triggering condition includes: signal quality of a neighbor cell being higher than signal quality of the reference cell by a threshold.

Similar to the above, there are two optimization ways for the optimization of the measurement events A1, A2 and A6.

In the first way, the conventional measurement events A1, A2 and A6 are retained, and measurement events D1, D2 and D6 are added. The measurement event D1 is the third triggering condition, the measurement event D2 is the fourth triggering condition, and the measurement event D6 is the fifth triggering condition. In this way, it may be compatible with the conventional technology. That is, the measurement events include not only A1 to A6, but also D1, D2 and D6. The base station may configure measurement for the UE as required in configuring.

In the second way, the conventional measurement events A1, A2 and A6 are respectively optimized to be the third triggering condition, the fourth triggering condition and the fifth triggering condition.

For example, the serving cell in the conventional measurement events A1 and A2 may be modified to be the reference cell, and the secondary cell (SCell) in the conventional measurement event A6 may be modified to be the reference cell.

Those of ordinary skilled in the art may configure the reference cell, to meet the optimization requirement arising with the evolution of the network. For example, the following requirement is considered.

In a scene of a heterogeneous network, the UE keeps wireless connection with cells of multiple base stations. In order to reduce signaling impact on the core network due to frequent movement of the UE among the cells, the macro base station is generally configured to be the first base station and the base station with a small cell is generally configured to be the second base station. In this way, when the cell of the UE is changed, the first base station of the UE does not transmit change from a view of MME, hence, there is no signaling impact of the mobility management on the MME. The serving cell in the conventional measurement event refers to any one of all the serving cells, hence, the measurement result report is triggered as long as any one of all the serving cells meets the condition. In order to further obtain the signal quality of the cell of the small cell base station, that is, in a case that the signal quality of the cell of the small cell base station is required, the reference cell may be configured to be the cell of the small cell base station.

In consideration of various requirements, in the embodiment, the reference cell may include at least one of: a serving cell of a specified base station, a secondary cell of a specified base station, a specified serving cell, a specified secondary cell, a primary cell of a specified base station, a default primary cell, serving cells of the first base station and the second base station, a serving cell meeting a first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

By flexible configuring the reference cell, the network side can obtain the measurement result for the cell of the first base station or the second base station in time. In a case that the signal quality of the UE and the cell of the first base station meets the predetermined condition, the measurement result for the second base station is refined by using air interface resources, and the measurement result is obtained in time, thereby performing scheduling and mobility management on the UE.

It should be noted that there may be multiple reference cells. For example, there are multiple reference cells if the reference cell includes all the serving cells in the set of serving cells. In this case, the fifth triggering condition "the signal quality of a neighbor cell being higher than the signal quality of the reference cell by a threshold" may be understood as: the signal quality of a neighbor cell being higher than the signal quality of any one of the reference cells by a threshold; the fourth triggering condition "the signal quality of the reference cell being lower than a fourth absolute threshold" may be understood as: the signal quality of any one of the reference cells being lower than a fourth absolute threshold; and the third triggering condition "the signal quality of the reference cell being higher than a third absolute threshold" may be understood as: the signal quality of any one of the reference cells being higher than a third absolute threshold.

The optimization for the conventional measurement events A1, A2, A3, A5 and A6 are described above. The optimization for the measurement event A4 may be as follows.

In the first optimization way, the conventional measurement event A4 is retained, and a measurement event D4 is added. The measurement event D4 is "the signal quality of the reference cell being higher than a threshold". Here, the reference cell may include at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station. In this way, it may be compatible with the conventional measurement report triggering condition.

In consideration of the above-mentioned other measurement events, in the first optimization way, the measurement events A1 to A6 are retained, and the measurement events D1 to D6 are added. In practice, the base station may select an appropriate measurement event from A1 to A6 and D1 to D6 for the UE according to different situations.

In the second optimization way, the neighbor cell in the measurement event A4 is modified to include at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

The neighbor cell is not only involved in the measurement event A4. In other embodiments of the disclosure, the neighbor cell involved in all the above embodiments may include at least one of: a cell which does not provide service to the UE, a cell, which does not provide service to the UE, of the first base station, a cell, which does not provide service to the UE, of the second base station, a specified cell, a serving cell of a specified base station, and a cell, which does not provide service to the UE, of a specified base station.

The above description relates to the measurement result report based on triggering of the measurement event. In practice, the concept of the disclosure is also applied to the mechanism of periodically measuring and reporting the measurement result.

Therefore, in other embodiments of the disclosure, "the measurement report triggering condition for the reference cell" may include a sixth triggering condition. The sixth triggering condition includes: periodically reporting the measurement result for the reference cell.

The "reference cell" in the sixth triggering condition may include at least one of: a cell of the first base station, a cell of the second base station, a cell which is the only one that keeps wireless communication with the UE, a cell keeping uplink wireless communication with the UE, a cell keeping downlink wireless communication with the UE, a specified cell, any cell in a set of reference cells, all cells in the set of reference cells, a cell meeting a first preset condition in the set of reference cells, a serving cell of a specified base station, a secondary cell of a specified base station, a specified serving cell, a specified secondary cell, a primary cell of a specified base station, a default primary cell, serving cells of the first base station and the second base station, a cell meeting the first preset condition in a set of serving cells, any serving cell in the set of serving cells, all serving cells in the set of serving cells, an anchor cell, all secondary cells in a set of secondary cells, any secondary cell in the set of secondary cells, and a cell meeting the first preset condition in the set of secondary cells.

More specifically, the "cell of the first base station" mentioned in all the above embodiments may include at least one of: the primary cell of the first base station, and a cell, which keeps timing alignment with the UE, of the first base station.

The "cell of the first second station" mentioned in all the above embodiments may include at least one of: the primary cell of the second base station, and a cell, which keeps timing alignment with the UE, of the second base station.

The "cell keeping wireless communication with the UE" mentioned in all the above embodiments may be a cell having a wireless link with the UE.

The "specified base station" mentioned in all the above embodiments may include the first base station and/or the second base station.

The "specified secondary cell" mentioned in all the above embodiments may include the primary cell of the second base station.

The anchor base station mentioned in all the above embodiments may refer to a cell providing the function of an anchor base station for the UE.

The serving cell mentioned in all the above embodiments may refer to a cell proving a wireless link for the UE.

The "set of reference cells" may include at least one of: primary cells of all the base stations, the primary cell of a specified base station, and all the primary cell providing the wireless link for the UE. The "at least one of" may refer to any one of the three kinds of the primary cell, i.e., the primary cells of all the base stations, the primary cell of the specified base station, and all the primary cell providing the wireless link for the UE; or union or intersection of any two of the three kinds of the primary cell; or union or intersection of the three kinds of the primary cell. For example, "the set of reference cells" may include the primary cells of all the base stations and all the primary cell providing the wireless link for the UE, and also includes the primary cells, which provide the wireless link for the UE, of all the base stations. Furthermore, "the primary cell of the specified base station" may include the primary cell of the first base station (that is, the specified base station is the first base station) for the UE, or, the primary cell of the second base station (that is, the specified base station is the second base station) assigned to the UE.

The "set of neighbor cells" refers to the set consisting of all the neighbor cells, that is, the set of the neighbor cells includes all the neighbor cells. Similarly, the "set of secondary cells" refers to the set consisting of all the secondary cells, that is, the set of the secondary cells includes all the secondary cells. Similarly, the "set of serving cells" refers to the set consisting of all the serving cells, that is, the set of the serving cells includes all the serving cells.

Furthermore, the primary cell is a cell which meets a second preset condition. The second preset condition may include at least one of: being subjected to wireless link monitor performed by the UE, transmitting an RRC message to the UE, transmitting a packet after RRC message processing to the UE, and generating an RRC message.

Furthermore, the primary cell may include a cell having a PUCCH (physical uplink control channel) in uplink.

It should be noted that, the reference cell and the neighbor cell may be intra-frequency cells or inter-frequency cells; or the reference cell and the neighbor cell are intra-frequency cells but operate in different time domains and/or different frequency bands.

From a view of the set of reference cells and the set of neighbor cells, a reference cell selected from the set of reference cells and a neighbor cell in the set of neighbor cells are intra-frequency cells or inter-frequency cells, or are intra-frequency cells but operate in different time domains and/or different frequency bands. Similarly, a cell selected from any set and a cell in any another set are intra-frequency cells or inter-frequency cells, or are intra-frequency cells but operate in different time domains and/or different frequency bands.

From a view of the inner of the set, any cell and any another cell in a same set are intra-frequency cells or inter-frequency cells. The set of reference cells is taken as an example, any cell in the set of reference cells and any another cell in the set of reference cells are intra-frequency cells or inter-frequency cells. Similarly, any cell in the set of serving cells and any another cell in the set of serving cells are intra-frequency cells or inter-frequency cells. Any cell in the set of secondary cells and any another cell in the set of secondary cells are intra-frequency cells or inter-frequency cells.

From a view of the inner and exterior of the set, it may be understood that a part of cells in the set of reference cells and a part of cells in the set of neighbor cells are intra-frequency cells, and the part of cells in the set of reference cells and another part of cells in the set of the neighbor cells are inter-frequency cells. Similarly, a part of cells in any set and a part of cells in any another set are intra-frequency cells, and the part of cells in the any set and another part of cells in the any another set are inter-frequency cells The intra-frequency may refer to that the center frequency points of the carrier bands in operation are the same. The inter-frequency may refer to that the center frequency points of the carrier bands in operation are different. The operating in different time domains may refer to receiving downlink signals on different subframes. The intra-frequency but operating in different frequency bands may refer to that the center frequency points of the carrier bands in operation are the same but the frequency bands are different.

In addition, the cell which meets the first preset condition in any set above is selected periodically according to a preset periodicity (that is, selected every a preset time interval), and/or is selected when a selection triggering condition is met. The "first preset condition" may include: the signal quality being the highest, or the signal quality being the lowest, or the signal quality being in top N, or the signal quality being in last M, or the signal quality being the X-th high, or the signal quality being the Y-th low, with N, M, X and Y being natural numbers.

More specifically, the "selection triggering condition" may at least include: a fluctuation of the measurement result exceeding a threshold.

The fluctuation may include at least one of a first fluctuation and a second fluctuation.

The first fluctuation may include: a current measurement result fluctuating compared with a history measurement result for a particular cell or any cell in a set.

The second fluctuation may include at least one of: a compare value between current measurement results of any two cells in a same set fluctuating, a compare value between current measurement results of two selected cells in a same set fluctuating, and a compare value between current measurement results of a particular cell and any another cell in a same set fluctuating.

The set in the first fluctuation and the second fluctuation refers to the set of reference cells, the set of serving cells or the set of secondary cells. The particular cell may be the cell which meets the first preset condition selected at the last time. The "two selected cells" may be the cell whose signal quality is the first (P-th) high and the cell whose signal quality is the second (P+1-th) high, or the cell whose signal quality is the first ((Q+1)-th) low and the cell whose signal quality is the second (Q-th) low. P and Q are natural numbers.

The predetermined time interval for selection depends on the above periodicity. The periodicity may be transmitted to the UE by the base station, or may be stored in the UE locally, that is, the periodicity is set when the UE is manufactured.

According to granularity, the periodicity may include at least one of: a periodicity based on the UE (that is, each UE may have a dedicated periodicity), a periodicity based on the measurement report triggering condition (that is, each measurement report triggering condition may have a dedicated periodicity), a periodicity based on the cell (that is, each cell may have a dedicated periodicity), and a periodicity based on cell frequency (that is, each cell frequency may have a dedicated periodicity).

The "at least one of" may refer to any one of the four kinds of periodicity, i.e., the periodicity based on the UE, the periodicity based on the measurement report triggering condition, the periodicity based on the cell, and the periodicity based on the cell frequency; or union or intersection of any two of the four kinds of periodicity; or union or intersection of any three of the four kinds of periodicity; or union or intersection of the four kinds of periodicity. For example, the periodicity may be the periodicity based on both the UE and the measurement report triggering condition.

The signal quality is described below. In the embodiments of the disclosure, the signal quality of any cell in any set in all the embodiments described above may be obtained at least based on the signal quality of the reference signal. In addition, the signal quality of any cell in any set may also be obtained based on an offset value. The offset value may include at least one of: a hysteresis value, a frequency offset value of the reference signal, an offset value of a cell that the reference signal belongs to, and an offset value caused by comparison among different kinds of reference signals.

The above reference signal may include at least one of: a cell-specific reference signal (CRS), a demodulation reference signal (DMRS), a discovery reference signal (DRS), a tracking reference signal (TRS), a density-reduced channel status information (CRS), a channel status information-reference signal (CSI-RS), and a sounding reference signal (SRS), which is not limited herein.

The signal quality of the cell mentioned in the embodiments of the disclosure may also refer to the signal quality of a wireless link of the cell, such as the signal quality of the remote radio head of the cell or the signal quality of one or more wireless ports of the cell. The signal quality of the cell mentioned in the embodiments of the disclosure may refer to the signal quality of the reference signal described above.

In the above measurement events D1 to D6, the measurement events D1, D2, D4 and D5 relate to the comparison between the signal quality of the cell and the threshold, and the measurement events D3 and D6 relate to the comparison in the signal quality between two cells.

In a case that the signal quality may be the signal quality of the reference signal, the signal quality of a cell being higher or lower than a threshold mentioned in the measurement events D1, D2, D4 and D5 of the disclosure may refer to that the signal quality of the reference signal of the cell is higher or lower than the threshold at any sampling time points within a time period or at multiple sampling time points within a time period or at all sampling time points within a time period.

The signal quality of a cell A being higher or lower than the signal quality of a cell B mentioned in the measurement events D3 and D6 of the disclosure may refer to that the signal quality of a first reference signal of the cell A is higher (or lower) than the signal quality of a second reference signal of the cell B (the first and the second are only to distinguish the reference signals).

In addition, the comparison formula for comparing the signal quality of the reference signal with the threshold and the comparison formula for comparing the signal quality of the reference signal with the signal quality of another reference signal may include an offset value. The comparison formula includes an entering condition and a leaving condition commonly used in the LTE measurement condition.

The examples are as follows.

The condition of the signal quality of the reference signal being higher than a signal threshold include:

the entering condition is Mcp−Hys>Thresh;
the leaving condition is Mcp+Hys<Thresh;

Mcp represents the signal quality of the reference signal, Hys represents a hysteresis parameter, and Thresh represents the threshold configured by the network side.

It should be noted that the hysteresis parameter Hys merely one of the offset value.

Optional, more parameters may be introduced into the offset value to make the signal quality of the reference signal more accurate, for example:

the entering condition is Mcp+Opcp−Hys>Thresh;
the leaving condition is Mcp+Opcp+Hys<Thresh;

Mcp represents the signal quality of the reference signal, Hys represents a hysteresis parameter, Thresh represents the threshold configured by the network side, and Opcp represents the parameter related to the signal of the reference signal, such as the parameter related to one or more of transmission power, subframe resource, frequency priority, cell priority and CSI-RS resource priority.

The condition of the signal quality of the first reference signal being higher than the signal quality of the second reference signal includes:

the entering condition is Mn+Ofn+Ocn−Hys>Mp+Ofp+Ocp+Off;
the leaving condition is Mn+Ofn+Ocn+Hys<Mp+Ofp+Ocp+Off;

Mn represents the signal quality of the first reference signal, Hys represents a hysteresis parameter, Off represents the offset value configured by the network side, Ofn represents a parameter related to the frequency of the first reference signal, Ocn represents a parameter related to the cell and/or port corresponding to the first reference signal. Correspondingly, Mp represents the signal quality of the second reference signal, Ofp represents a parameter related to the frequency of the second reference signal, Ocp represents a parameter related to the cell and/or port corresponding to the second reference signal. In a case that the first reference signal and the second reference signal belong to a same carrier frequency, the parameters related to the carrier frequency may not be presented in the inequation. A communication node can determine more flexibly the preset condition for a measurement report by designing these parameters.

The parameter Opcp may be introduced into one side of the inequation corresponding to the first reference signal. The parameter is related to the first reference signal, for example, the parameter is related to one or more factors of transmission power, subframe resource, frequency priority, cell priority and CSI-RS resource priority.

Various deformations of the formulas described in the disclosure are also within the scope of the present disclosure, which are not described herein.

In a case that the signal quality of different kinds of reference signals are compared, offset values of the different kinds of reference signals may be introduced into the formulas of the entering condition and the leaving condition, which is not described in details herein in consideration of the multiple preset conditions mentioned in the disclosure.

Corresponding to the above measuring method, it is provided a measuring apparatus according to an embodiment of the disclosure.

In a case that the measuring apparatus is a base station, the measuring apparatus at least includes a first CPU 1 and a first transmitter 2, referring to FIG. 2b. The first CPU 1 is at least configured to configure measurement configuration information of a UE; and the first transmitter 2 is at least configured to transmit the measurement configuration information.

Figure 2C:
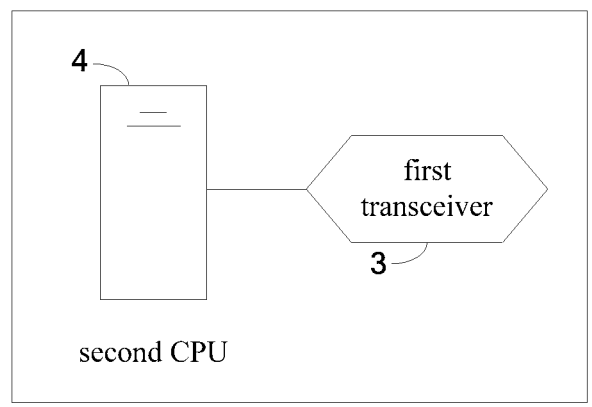
FIG. 2c is another schematic structural diagram of a measuring apparatus according to an embodiment of the disclosure.

In a case that the measuring apparatus is a UE, the measuring apparatus at least includes a first transceiver 3 and a second CPU 4, referring to FIG. 2c.

The first transceiver 3 is at least configured to receive the measurement configuration information configured by a base station side, and to report a measurement result if a measurement report triggering condition for a reference cell is met.

The second CPU 4 is at least configured to determine whether the measurement report triggering condition for the reference cell is met.

The content and optimization way of the measurement report triggering condition may refer to the above description of the measuring method, which is not described in details herein.

In other embodiments of the disclosure, in order to respectively optimize the conventional measurement events A3 and A5 to be the first triggering condition and the second triggering condition described above, the first CPU 1 of the base station may be further configured to configure a cell keeping wireless communication with the UE to be a primary cell, and the configured primary cell acts as the reference cell. In this way, the conventional measurement events A3 and A5 may be respectively optimized to be the first triggering condition and the second triggering condition. Furthermore, the first CPU 1 may instruct the first transmitter 2 to transmit the configured primary cell, to notify the UE.

The second CPU 4 of the UE is further configured to instruct the first transceiver 3 to report the measurement result if signal quality of a neighbor cell is higher than signal quality of the primary cell (the primary cell acts as the reference cell described above) configured by the base station side by a threshold or if signal quality of the primary cell configured by the base station side is lower than a first absolute threshold and signal quality of a neighbor cell is higher than a second absolute threshold.

It is also mentioned above that a cell meeting the first preset condition in any set is selected periodically according to a preset periodicity and/or is selected when a selection triggering condition is met. In the embodiment, both the periodical selecting and the selecting when the selection triggering condition is met are performed by the second CPU of the UE.

In the conventional measurement techniques, the UE reports the measurement result (the signal quality of the cell) to the network side after the measurement triggering condition is met. As the introduction of the technique with which the UE can simultaneously communicate with two kinds of base stations (the first base station and the second base station), in order to ensure the effectiveness of the reporting, the measurement result for the second base station is required to be notified to the second base station, but the second base station may not require the measurement result for the first base station. If the UE reports an unnecessary measurement result to the base station, the base station can not perform mobility management on the UE. Therefore, in the embodiment, the base station side may configure the reporting of the measurement result, and the measuring method performed by the base station side includes:

configuring a report object to which the measurement result of the UE is reported, so that the UE reports the measurement result to the corresponding report object if the measurement report triggering condition for the reference cell is met.

The measuring method performed by the UE side may include:

receiving the report object to which the measurement result is reported, where the report object is configured by the base station side; and reporting the measurement result to the corresponding report object.

In this way, the base station side pertinently configures the report object, which at least solves the problem of reporting the unnecessary measurement result to the base station, thereby ensuring the effectiveness of the reporting.

The report object to which the measurement result of the UE is reported may be configured not only for the measurement report triggering condition for the reference cell, but may be also configured for the conventional measurement events, so that the UE reports the measurement result to the corresponding report object if the conventional measurement report triggering condition is met.

It should be noted that, the report object may be configured by the first base station or the second base station. Generally, the configuration information of the report object is generated by the first base station. After generating the configuration information of the report object, the first base station may transmit the configuration information of the report object to the UE. Alternatively, the first base station may transmit the configuration information of the report object to the second base station, and the second base station issues the configuration information of the report object to the UE. Especially in a case that the UE can only receive the signal from the cell of the second base station, the first base station transmits the configuration information of the report object to the second base station, and the second base station issues the configuration information of the report object. Therefore, if it is defined from a view of generating the configuration information of the report object, the report object is configured by the first base station; and if it is defined from a view of issuing the configuration information of the report object, the report object may be sometimes configured by the second base station. In particular cases, especially in a case that the UE can only receive the signal from the cell of the second base station, the measurement configuration information may be generated by the second base station and then issued by the second base station.

Figure 2D:
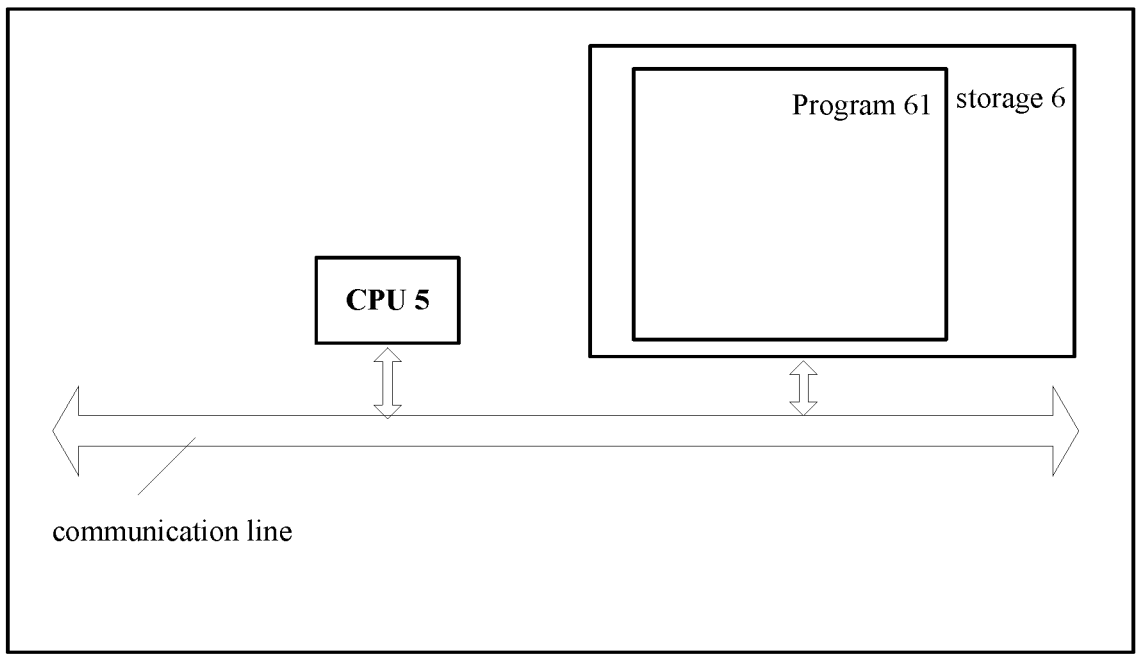
FIG. 2d is another schematic structural diagram of a measuring apparatus according to an embodiment of the disclosure.

From a view of an apparatus, the measuring apparatus corresponding to the base station may at least include a third CPU 5 and a storage 6, referring to FIG. 2d. The third CPU 5 at least performs the following step by executing a software program 61 stored in the storage 6 and invoking data stored in the storage 6:

configuring a report object to which a measurement result of a UE is reported, so that the UE reports the measurement result to the corresponding report object.

The third CPU 5 and the first CPU 1 may be a same hardware device, that is, the first CPU 1 may be further configured to configure the report object to which the measurement result of the UE is reported. The third CPU 5 and the first CPU 1 may also be two hardware devices independent from each other.

Furthermore, the third CPU 5 may instruct the first transmitter 2 to transmit the configured report object to the UE.

Figure 2E:
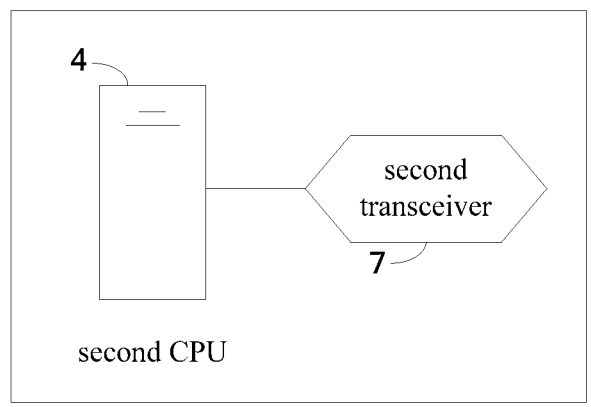
FIG. 2e is another schematic structural diagram of a measuring apparatus according to an embodiment of the disclosure.

Referring to FIG. 2e, the measuring apparatus corresponding to the UE may at least include a second transceiver 7, configured to receive a report object to which a measurement result is reported, where the report object is configured by a base station side, and to report the measurement result to the corresponding report object.

The second transceiver 7 and the first transceiver 3 may be a same hardware device, that is, the first transceiver may be further configured to receive the report object to which the measurement result is reported, where the report object is configured by a base station side, and to report the measurement result to the corresponding report object. Alternatively, the second transceiver 7 and the first transceiver 3 may be two hardware devices independent from each other.

In other embodiments of the disclosure, the report object in all the above embodiments may be a specified base station or a specified cell. In this way, the eNB configures the report object to which the measurement result of the UE is reported, so that the UE reports the measurement result to the specified base station or a cell of the base station.

In an implementation, the "configuring a report object to which the measurement result of the UE is reported" may include: mapping the report object to a measurement identification, so that the UE reports the measurement result to the report object mapped to the measurement identification.

In another embodiments, the "configuring a report object to which the measurement result of the UE is reported" may include: mapping the report object to a specified measurement report triggering condition, so that the UE reports the measurement result to the report object mapped to the specified measurement report triggering condition.

As mentioned above, one measurement identification corresponds to one measurement object and one measurement event, therefore, more specifically, the report object may be mapped to a specified measurement object.

In the conventional technology, although the UE operates in multiple cells, all the multiple cells use the same DRX configuration. With the introduction of the technology with which the UE simultaneously communicates with multiple base stations, a base station may need to know DTX (discontinuous transmission) configuration information of other base station communicating with the UE in configuring the UE to perform measurement, otherwise accurate measurement result can not be obtained if the UE is configured to measure the other base station when the other base station does not transmit information.

In addition, different base stations may provide different services for the UE. For example, a base station provides data service, and other base station provides phone service. Therefore, the UE may use different DRX (discontinuous reception) configuration information for different base station cells according to different services provided by the cells.

The DRX parameter and the DTX parameter may be collectively referred to as a discontinuous data transmission parameter. In the conventional technology, interacting for configuration information of the discontinuous data transmission parameter is not performed between base stations. With the introduction of the technology with which the UE simultaneously communicates with multiple base stations, the base station can not effectively schedule the UE or can not instruct the UE to measure other cells if interacting for configuration information of the discontinuous data transmission parameter is not performed between base stations, thereby affecting the mobility of the UE.

In view of the above, it is provided an information interacting method and an information interacting apparatus according to embodiments of the disclosure. The interacting method may be applied to a handover process, a setup process of a data distribution channel, a setup process of a base station interface, an update process of base station configuration, or an update process of UE configuration information over interfaces of base stations.

The above interacting method may be performed by a third base station, a fourth base station or a UE. It should be noted that, the third base station and the fourth base station are only for distinguishing and have no special meanings.

In a case that the interacting method is performed by the third base station, the interacting method includes: interacting with the fourth base station for the configuration information of the discontinuous data transmission parameter, so that a base station side performs scheduling and/or mobility management on a user equipment. The base station side includes the third base station and/or the fourth base station.

Correspondingly, in a case that the interacting method is performed by the fourth base station, the interacting method includes: interacting with the third base station for the configuration information of the discontinuous data transmission parameter.

Figure 3:
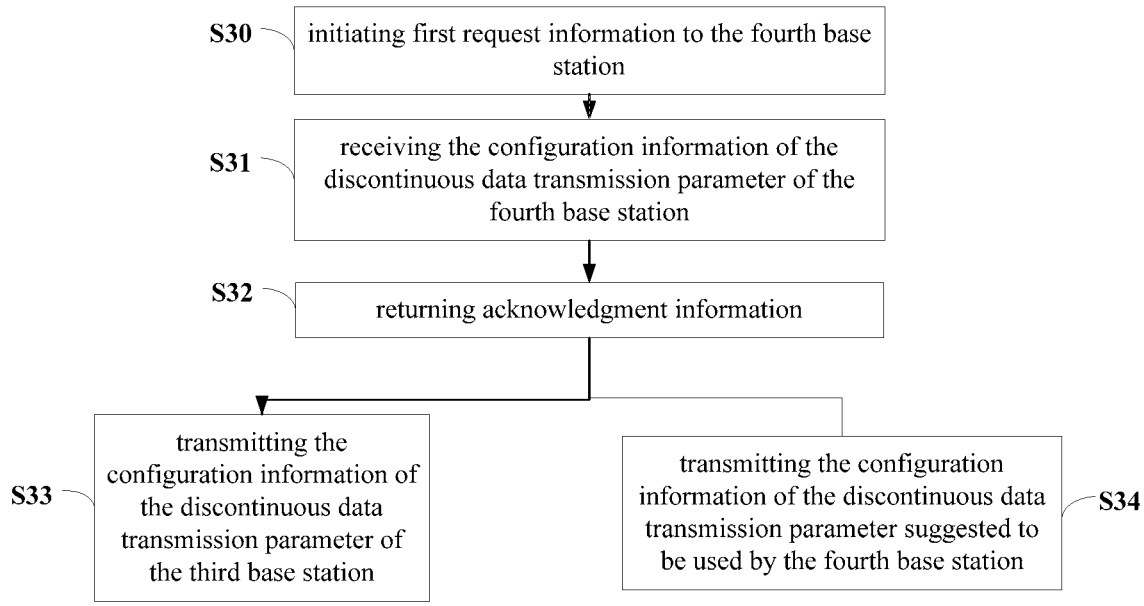
FIG. 3 is a flow chart of an information interacting method according to an embodiment of the disclosure.

In other embodiments of the disclosure, in a case that the interacting method is performed by the third base station, the "interacting with the fourth base station for the configuration information of the discontinuous data transmission parameter" may include the following S30 to S34, referring to FIG. 3.

In S31, the configuration information of the discontinuous data transmission parameter of the fourth base station (which is transmitted by the fourth base station) is received.

Correspondingly, in a case that the interacting method is performed by the fourth base station, the "interacting with the third base station for the configuration information of the discontinuous data transmission parameter" may include: transmitting to the third base station the configuration information of the discontinuous data transmission parameter of the fourth base station. That is, the fourth base station transmits to the third base station the configuration information of the discontinuous data transmission parameter of the fourth base station itself.

In other embodiments of the disclosure, before receiving the configuration information of the discontinuous data transmission parameter of the fourth base station, the "interacting with the fourth base station for the configuration information of the discontinuous data transmission parameter" may further include S30.

In S30, first request information is initiated to the fourth base station. The first request information is at least configured to request the fourth base station to transmit the configuration information of the discontinuous data transmission parameter of the fourth base station itself.

Correspondingly, in a case that the interacting method is performed by the fourth base station, the "interacting with the third base station for the configuration information of the discontinuous data transmission parameter" may further include: receiving the above first request information initiated by the third base station.

In other embodiments of the disclosure, after "receiving the configuration information of the discontinuous data transmission parameter of the fourth base station" in all the above embodiments, the "interacting with the fourth base station for the configuration information of the discontinuous data transmission parameter" may further include S32, referring to FIG. 3 again.

In S32, acknowledgment information is returned (by the third base station).

Correspondingly, in a case that the interacting method is performed by the fourth base station, the "interacting with the third base station for the configuration information of the discontinuous data transmission parameter" may further include: receiving the acknowledgment information returned by the third base station.

In addition, in other embodiments of the disclosure, the "interacting with the fourth base station for the configuration information of the discontinuous data transmission parameter" may further include S33 and/or S34.

In S33, the configuration information of the discontinuous data transmission parameter of the third base station is transmitted to the fourth base station (that is, the third base station transmits to the fourth base station the configuration information of the discontinuous data transmission parameter of the third base station itself).

In addition/alternatively, in S34, the configuration information of the discontinuous data transmission parameter suggested to be used by the fourth base station is transmitted to the fourth base station.

Correspondingly, in a case that the interacting method is performed by the fourth base station, the "interacting with the third base station for the configuration information of the discontinuous data transmission parameter" may further include:

receiving the configuration information of the discontinuous data transmission parameter of the third base station; and/or receiving the configuration information of the discontinuous data transmission parameter that the third base station suggests the fourth base station using.

S33 and S34 may be independent from each other. Alternatively, the configuration information of the discontinuous data transmission parameter of the third base station and/or the configuration information of the discontinuous data transmission parameter suggested to be used by the fourth base station may be carried in the acknowledgment information. Similarly, the step in which the fourth base station side receives the configuration information of the discontinuous data transmission parameter of the third base station and/or the configuration information of the discontinuous data transmission parameter suggested to be used by the fourth base station may be an independent step or may be combined into the step of receiving the acknowledgment information.

In addition, in other embodiments of the disclosure, before the third base station transmits to the fourth base station the configuration information of the discontinuous data transmission parameter of the third base station and/or the configuration information of the discontinuous data transmission parameter suggested to be used by the fourth base station, the following step may be further performed:

receiving second request information initiated by the fourth base station, where the second request information is configured to request the third base station to transmit the configuration information of the discontinuous data transmission parameter of the third base station and/or to transmit to the fourth base station the configuration information of the discontinuous data transmission parameter suggested to be used by the fourth base station.

Correspondingly, the operation performed by the fourth base station is:

transmitting the above second request information.

It should be noted that, after receiving the configuration information of the discontinuous data transmission parameter that the third base station suggests the fourth base station using, the fourth base station may adopt the suggestion from the third base station directly, and in this case, the negotiation is completed. Alternatively, the fourth base station may not adopt the suggestion from the third base station, and in this case, the fourth base station may re-transmit to the third base station the configuration information of the discontinuous data transmission parameter of the fourth base station itself, and the third base station re-performs S31 and so on until the fourth base station adopts the suggestion. Alternatively, the fourth base station may transmit to the third base station the configuration information of the discontinuous data transmission parameter suggested to be used by the third base station. The third base station may determine whether to adopt the suggestion from the fourth base station.

It is mentioned above that the above interacting method may be used in the handover process or in the setup process of the data distribution channel. The first request information may be a handover request for a UE in a case that the interacting method is applied to the handover process. The first request information is a data distribution request for a UE in a case that the interacting method is applied to the setup process of the data distribution channel.

It should be noted that in a case that the above interacting method is applied to the handover process, the third base station refers to a source base station and the fourth base station refers to a target base station.

In other embodiments of the disclosure, the interacting between third base station and fourth base stations may be implemented via a third party device. The third party device may be at least one of OAM (Operation Administration and Maintenance), a gateway and a super node.

Figure 4A:
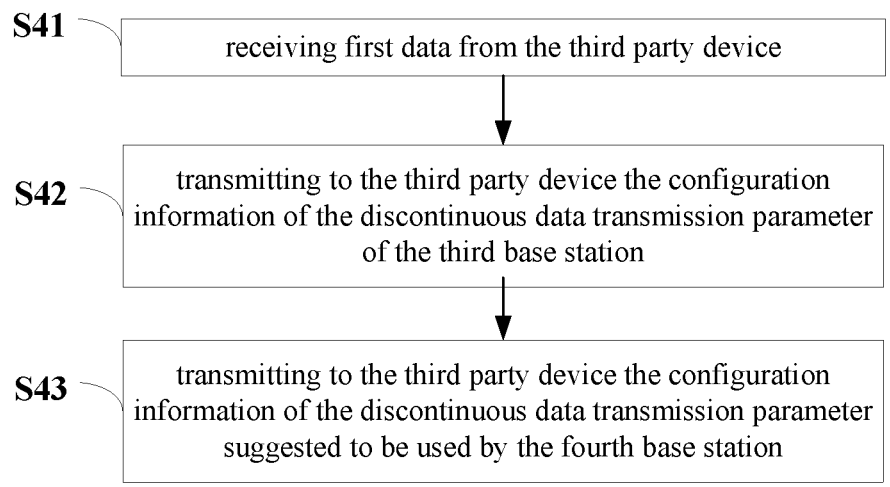
FIG. 4a is another flow chart of an information interacting method according to an embodiment of the disclosure.

On the basis of the third party device, the "interacting with the fourth base station for the configuration information of the discontinuous data transmission parameter" may include S41 to S43, referring to FIG. 4a.

In S41, first data from the third party device is received.

The first data may include one or more kind of information. For example, the first data may include at least one of: the configuration information of the discontinuous data transmission parameter of the fourth base station which is forwarded by the third party device; the configuration information of the discontinuous data transmission parameter that the fourth base station suggests the third base station using and which is forwarded by the third party device; and the configuration information of the discontinuous data transmission parameter that the third party device suggests the third base station using.

The third base station may return acknowledgment information to the third party device, so that the third party device forwards the acknowledgment information to the fourth base station.

After receiving the configuration information of the discontinuous data transmission parameter suggested by the fourth base station or the third party device, the third base station may directly use the configuration information of the discontinuous data transmission parameter suggested by the fourth base station or the third party device.

Priority may also be set for the fourth base station and the third party device. If both the configuration information of the discontinuous data transmission parameter suggested by the fourth base station and the configuration information of the discontinuous data transmission parameter suggested by the third party device are received, the suggestion with a higher priority may be preferentially adopted.

It should be noted that the first data may include multiple kinds of information, and "receiving the first data" in the disclosure may be understood as receiving multiple kinds of information at one time, or receiving multiple kinds of information for many times, with each time receiving one kind or two kinds of information.

In a case that the "receiving the first data" is understood as receiving multiple kinds of information for many times, S41 may include three sub-steps of S411 to S413. In S411, the configuration information of the discontinuous data transmission parameter of the fourth base station which is forwarded by the third party device is received. In S412, the configuration information of the discontinuous data transmission parameter that the fourth base station suggests the third base station using and which is forwarded by the third party device is received. In S413, the configuration information of the discontinuous data transmission parameter that the third party device suggests the third base station using is received.

Figure 4B:
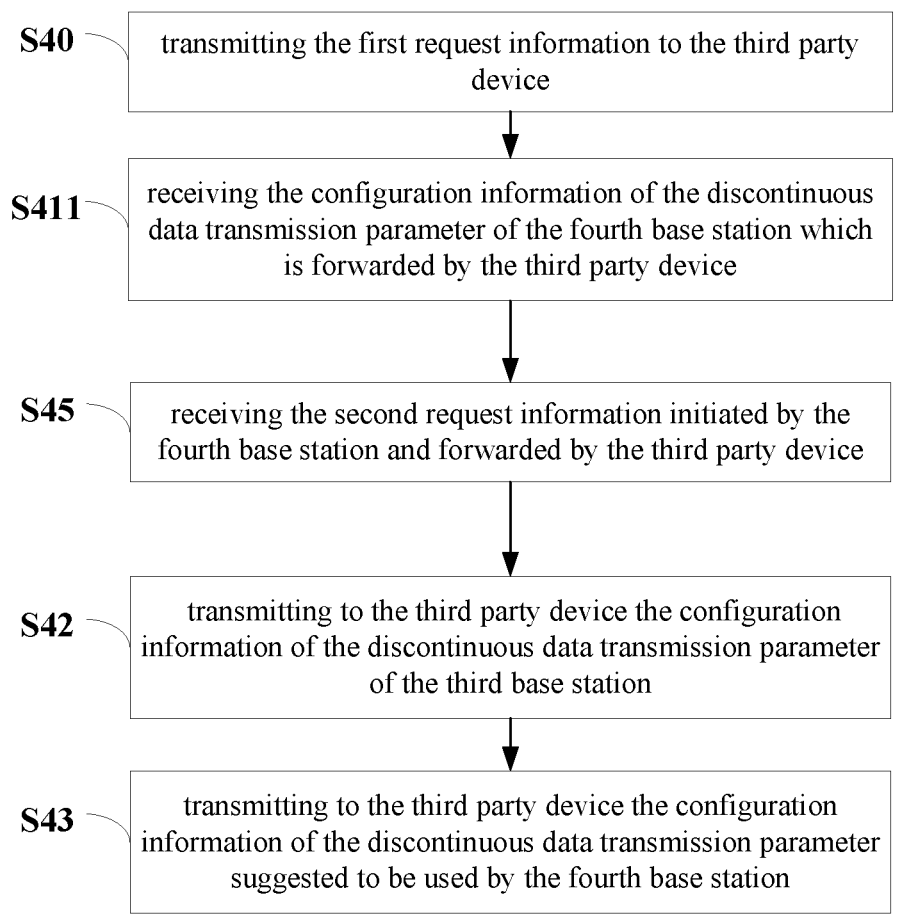
FIG. 4b is another flow chart of an information interacting method according to an embodiment of the disclosure.

In other embodiments of the disclosure, before S41 or S411, the interacting with the fourth base station for the configuration information of the discontinuous data transmission parameter may further include S40, referring to FIG. 4b.

In S40, the first request information is transmitted to the third party device. The first request information is forwarded to the fourth base station by the third party device, and the first request information is configured to request the fourth base station to transmit the configuration information of the discontinuous data transmission parameter of the fourth base station.

Correspondingly, in a case that the interacting method is performed by the fourth base station, the "interacting with the third base station for the configuration information of the discontinuous data transmission parameter" may further include:

receiving the first request information initiated by the third base station and forwarded by the third party device.

The fourth base station then transmits to the third party device the configuration information of the discontinuous data transmission parameter of the fourth base station itself, so that the third party device forwards the configuration information of the discontinuous data transmission parameter of the fourth base station.

In addition, the third base station may transmit to the third party device the configuration information of the discontinuous data transmission parameter of the third base station itself (S42), so that the third party device forwards the configuration information of the discontinuous data transmission parameter of the third base station to the fourth base station, or so that the third party device transmits to the third base station the configuration information of the discontinuous data transmission parameter suggested to be used by the third base station.

The corresponding operation of the fourth base station may be: receiving the configuration information of the discontinuous data transmission parameter of the third base station which is forwarded by the third party device.

In other embodiments of the disclosure, after receiving the configuration information of the discontinuous data transmission parameter of the third base station in all the above embodiments, the fourth base station may give a suggestion to the third base station, that is, the fourth base station may transmit to the third base station the configuration information of the discontinuous data transmission parameter suggested to be used by the third base station.

The third base station may give a suggestion about the configuration information of the discontinuous data transmission parameter of the fourth base station. In view of this, in other embodiments of the disclosure, the "interacting with the fourth base station for the configuration information of the discontinuous data transmission parameter" in all the above embodiments may further include S43.

In S43, the configuration information of the discontinuous data transmission parameter suggested to be used by the fourth base station is transmitted to the third party device, so that the third party device forwards the configuration information of the discontinuous data transmission parameter suggested to be used by the fourth base station.

The corresponding operation of the fourth base station may include: receiving the configuration information of the discontinuous data transmission parameter that the third base station suggests the fourth base station using, which is forwarded by the third party device.

It should be noted that S42 and S43 may be performed alternatively, or both S42 and S43 may be performed.

In other embodiments of the disclosure, before performing S42 and/or S43 in all the above embodiments, the third base station may further perform S45, referring to FIG. 4b.

In S45, second request information initiated by the fourth base station and forwarded by the third party device is received. The second request information is configured to request the third base station to transmit the configuration information of the discontinuous data transmission parameter of the third base station and/or transmit the configuration information of the discontinuous data transmission parameter suggested to be used by the fourth base station.

For the fourth base station, the "interacting with the third base station for the configuration information of the discontinuous data transmission parameter" may further include: transmitting the second request information to the third party device.

Furthermore, the third party device, which acts as an independent device, may also give a suggestion to the fourth base station. Accordingly, the fourth base station may perform the operation which is: receiving the configuration information of the discontinuous data transmission parameter suggested to be used by the fourth base station, which is transmitted by the third party device.

According to the above description, in the interacting based on the third party device, the fourth base station may receive the configuration information of the discontinuous data transmission parameter of the third base station which is forwarded by the third party device; the configuration information of the discontinuous data transmission parameter that the third base station suggests the fourth base station using and which is forwarded by the third party device; and the configuration information of the discontinuous data transmission parameter that the third party device suggests the fourth base station using. Accordingly, for the fourth base station, the "interacting with the third base station for the configuration information of the discontinuous data transmission parameter" may include:

receiving second data from the third party device. The second data may include at least one of: the configuration information of the discontinuous data transmission parameter of the third base station which is forwarded by the third party device; the configuration information of the discontinuous data transmission parameter that the third base station suggests the fourth base station using and which is forwarded by the third party device; and the configuration information of the discontinuous data transmission parameter that the third party device suggests the fourth base station using.

After receiving the configuration information of the discontinuous data transmission parameter suggested by the third base station or the third party device, the fourth base station may directly use the suggested configuration information of the discontinuous data transmission parameter. Alternatively, the fourth base station may not adopt the suggested configuration information of the discontinuous data transmission parameter, and in this case, the fourth base station may re-transmit to the third party device the configuration information of the discontinuous data transmission parameter of the fourth base station itself, and the third party device forwards the configuration information of the discontinuous data transmission parameter of the fourth base station to the third base station for re-giving a suggestion, or the third party device re-gives a suggestion.

Figure 4C:
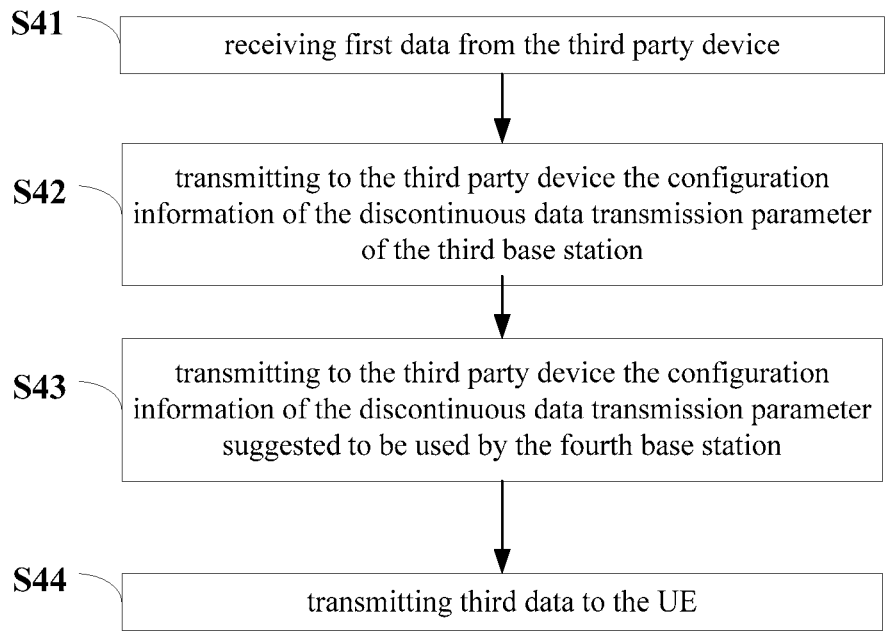
FIG. 4c is another flow chart of an information interacting method according to an embodiment of the disclosure.

In other embodiments of the disclosure, the above interacting method may further include S44, referring to FIG. 4c.

In S44, third data is transmitted to the UE.

The third data may also be transmitted to the UE by the fourth base station.

The third data may include the configuration information of the discontinuous data transmission parameter of the third base station and/or the fourth base station, so that the UE performs measurement and/or data transmission according to at least the third data.

More specifically, the third data may be transmitted to the UE by means of broadcast, an RRC message, a media access control control element (MACCE, MAC Control Element) or a physical layer command.

The configuration information of a DRX parameter, which belongs to the configuration information of the discontinuous data transmission parameter, is described below.

In other embodiments of the disclosure, the configuration information of the DRX parameter in all the above embodiments may be DRX configuration information of a UE for a cell, or DRX configuration information based on the configuration information of a DTX parameter.

More specifically, the "DRX configuration information of a UE for a cell" may be DRX configuration information of SRB (signaling radio bearer) of a UE for a cell, DRX configuration information of DRB (data radio bearer) of a UE for a cell, or DRX configuration information of carried data distribution. In a case that the DRX configuration information is accurate to the DRX configuration information of SRB of a UE for a cell or the DRX configuration information of DRB of a UE for a cell, the configuration of DRX is accurate to specific service. In addition, in other embodiments of the disclosure, the DRX may be further extended, the DRX may be discontinuous reception or no reception performed by a UE, or may be discontinuous reception or no reception performed by a base station.

With regard to the configuration information of the DTX parameter which belongs to the configuration information of the discontinuous data transmission parameter, the DTX parameter in all the above embodiments is the DTX parameter on a base station level or the DTX parameter on a UE level. The DTX parameter on a UE level refers to the DTX parameter configured for a UE. In addition, in other embodiments of the disclosure, the DTX may be further extended, the DTX may be discontinuous transmission or no transmission performed by a base station, or may be discontinuous transmission or no transmission performed by a UE.

The object of the above transmission (reception) or no transmission (no reception) may be at least one of a reference signal, a discovery signal, physical layer control domain information and physical layer data domain information, which is not limited herein.

In other embodiments of the disclosure, the configuration information of the DRX parameter in all the above embodiments may include configuration information of the DRX parameter in a time domain and/or configuration information of the DRX parameter in a frequency domain.

The configuration information of the DRX parameter in the time domain may determine to not receive or to receive information at a specified subframe or a specified time interval. The configuration information of the DRX parameter in the frequency domain may determine to not receive or to receive information at a specified sub-band. For example, in a case of operating at a certain carrier frequency band, the configuration information of the DRX parameter in the frequency domain may determine to not receive or to receive information at a specified sub-band within the carrier frequency band.

Similarly, in other embodiments of the disclosure, the configuration information of the DTX parameter in all the above embodiments may include configuration information of the DTX parameter in a time domain and/or configuration information of the DTX parameter in a frequency domain.

The configuration information of the DTX parameter in the time domain may determine to not transmit or to transmit information at a specified subframe or a specified time interval. The configuration information of the DTX parameter in the frequency domain may determine to not transmit or to transmit information at a specified sub-band. For example, in a case of operating at a certain carrier frequency band, the configuration information of the DRX parameter in the frequency domain may determine to not transmit or to transmit information at a specified sub-band within the carrier frequency band.

Figure 6:
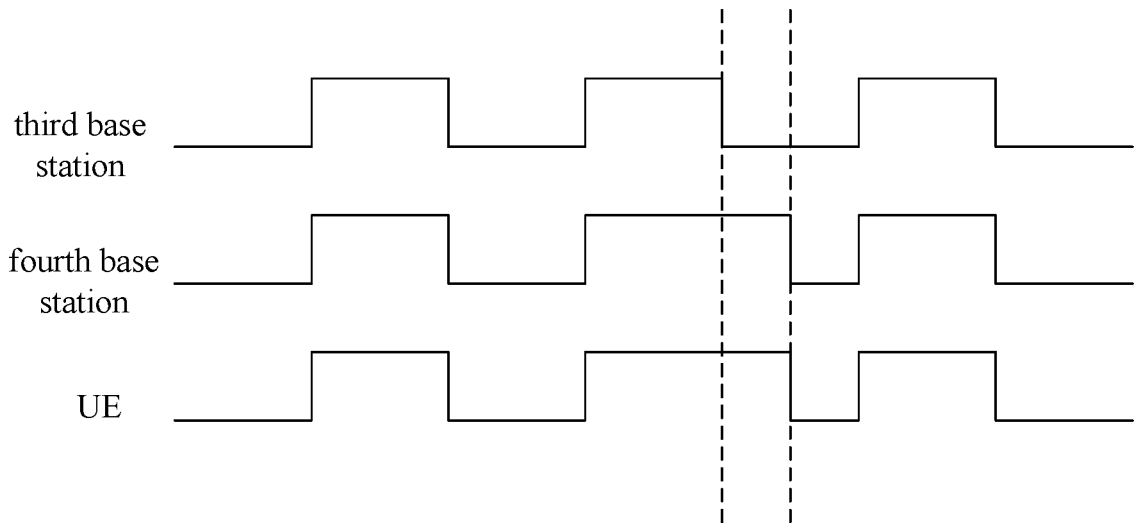
FIG. 6 is a schematic diagram of tending to be uniform according to an embodiment of the disclosure.

With the introduction of the technology with which the UE simultaneously communicates with multiple base stations, the operating frequency band of each base station may be different. If the operating frequency bands of base stations communicating with the UE can be supported by a same radio frequency device of the UE and the configurations of the discontinuous data parameters of all the base stations tend to be uniform, simultaneous open and close of the radio frequency device of the UE may be ensured as much as possible for power saving. For example, referring to FIG. 6, in a case that the configuration of the DRX parameter of the third base station and the configuration of the DRX parameter of the fourth base station are substantially the same, simultaneous open and close of the UE can be substantially ensured.

In view of the above, in other embodiments of the disclosure, at least one of the following is achieved by interacting for the configuration information of the discontinuous data transmission parameter between base stations: base stations using the configuration information of the discontinuous data transmission parameter tending to be uniform, and power of the UE being saved.

The configuration information of the discontinuous data transmission parameter may include at least one of the configuration information of the DRX parameter and the configuration information of the DTX parameter.

The configuration information of the DRX parameter, which belongs to the configuration information of the discontinuous data transmission parameter, is described in details below.

In other embodiments of the disclosure, the configuration information of the DRX parameter in all the above embodiments may be DRX configuration information of a UE, or DRX configuration information based on the configuration information of the DTX parameter.

The DRX configuration information of a UE includes DRX configuration information of a UE for a cell.

More specifically, the "DRX configuration information of a UE for a cell" may be the DRX configuration information of SRB (signaling radio bearer) of a UE for a cell, the DRX configuration information of DRB (data radio bearer) of a UE for a cell, or the DRX configuration information of carried data distribution. In a case that the DRX configuration information is accurate to the DRX configuration information of SRB of a UE for a cell or the DRX configuration information of DRB of a UE for a cell, the configuration of DRX is accurate to specific service. In addition, in other embodiments of the disclosure, the DRX may be further extended, the DRX may be discontinuous reception or no reception performed by a UE, or may be discontinuous reception or no reception performed by a base station.

With regard to the configuration information of the DTX parameter which belongs to the configuration information of the discontinuous data transmission parameter, the DTX parameter in all the above embodiments is the DTX parameter on a base station level or the DTX parameter on a UE level. The DTX parameter on a UE level refers to the DTX parameter configured for the UE. In addition, in other embodiments of the disclosure, the DTX may be further extended, the DTX may be discontinuous transmission or no transmission performed by a base station, or may be discontinuous transmission or no transmission performed by a UE.

The object of the above transmission (reception) or no transmission (no reception) may be at least one of a reference signal, a discovery signal, physical layer control domain information and physical layer data domain information, which is not limited herein.

In other embodiments of the disclosure, the configuration information of the DRX parameter in all the above embodiments may include the configuration information of the DRX parameter in a time domain and/or the configuration information of the DRX parameter in a frequency domain.

The configuration information of the DRX parameter in the time domain may determine to not receive or to receive information at a specified subframe or a specified time interval. The configuration information of the DRX parameter in the frequency domain may determine to not receive or to receive information at a specified sub-band. For example, in a case of operating at a certain carrier frequency band, the configuration information of the DRX parameter in the frequency domain may determine to not receive or to receive information at a specified sub-band within the carrier frequency band.

Similarly, in other embodiments of the disclosure, the configuration information of the DTX parameter in all the above embodiments may include the configuration information of the DTX parameter in a time domain and/or the configuration information of the DTX parameter in a frequency domain.

The configuration information of the DTX parameter in the time domain may determine to not transmit or to transmit information at a specified subframe or a specified time interval. The configuration information of the DTX parameter in the frequency domain may determine to not transmit or to transmit information at a specified sub-band. For example, in a case of operating at a certain carrier frequency band, the configuration information of the DRX parameter in the frequency domain may determine to not transmit or to transmit information at a specified sub-band within the carrier frequency band.

More specifically, the configuration information of the DRX parameter in all the above embodiments may include at least one of: a periodicity of DRX, an initial persistent timer, and a starting position of DRX.

The "tending to be uniform" may include at least one of: the starting positions of DRX for base stations being the same, the initial persistent timers for base stations being proportional with the proportion being m, and the periodicities of DRX for base stations being proportional with the proportion being n.

Alternatively, the "tending to be uniform" may include common configuration information of the DRX parameter is used for base stations.

In addition, the third base station and the fourth base station are taken as an example. The initial persistent timers for base stations being proportional with the proportion being m may refer to that the proportion between the initial persistent timer corresponding to the third base station and the initial persistent timer corresponding to the fourth base station is m, where m may be a natural number or a reciprocal of a natural number. Similarly, the periodicities of DRX for base stations being proportional with the proportion being n may refer to that the proportion between the periodicity of DRX corresponding to the third base station to the periodicity of DRX corresponding to the fourth base station is n, where n may be a natural number or a reciprocal of a natural number. m and n may be equal or unequal.

The interaction between base stations is described below. It should be noted that the interaction for the configuration information of the discontinuous data transmission parameter may be applied to the handover process, the setup process of the data distribution channel, the setup process of the base station interface, the update process of base station configuration, or the update process of UE configuration information over interfaces of base stations.

The above interacting method may be performed by a third base station or a fourth base station. It should be noted that the third base station and the fourth base station are only for distinguishing and have no special meanings.

In a case that the interacting method is performed by the third base station, the interacting method includes: interacting with the fourth base station for the configuration information of the discontinuous data transmission parameter, so that configuration parameter of the discontinuous data transmission parameter tending to be uniform is used for base stations and/or power of the UE is saved.

Correspondingly, in a case that the interacting method is performed by the fourth base station, the interacting method may include: interacting with the third base station for the configuration information of the discontinuous data transmission parameter.

Figure 7:
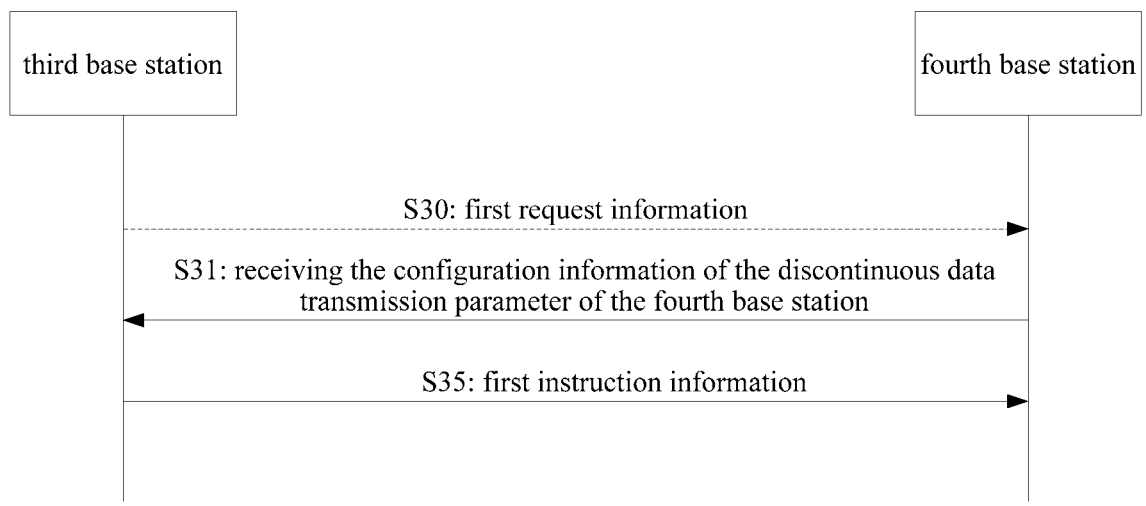
FIG. 7 is another flow chart of an information interacting method according to an embodiment of the disclosure.

Referring to FIG. 7, the "interacting with the fourth base station for the configuration information of the discontinuous data transmission parameter" may include S31.

In S31, the configuration information of the discontinuous data transmission parameter of the fourth base station (transmitted by the fourth base station) is received.

The third base station then may adjust the configuration information of the discontinuous data transmission parameter of the third base station itself based on the configuration information of the discontinuous data transmission parameter of the fourth base station, to make the configuration information of the discontinuous data transmission parameter of the third base station tends to be uniform with the configuration information of the discontinuous data transmission parameter of the fourth base station.

Correspondingly, in a case that the interacting method is performed by the fourth base station, the "interacting with the third base station for the configuration information of the discontinuous data transmission parameter" may include: transmitting to the third base station the configuration information of the discontinuous data transmission parameter of the fourth base station. That is, the fourth base station transmits to the third base station the configuration information of the discontinuous data transmission parameter of the fourth base station itself.

In other embodiments of the disclosure, before receiving the configuration information of the discontinuous data transmission parameter of the fourth base station, the "interacting with the fourth base station for the configuration information of the discontinuous data transmission parameter" may further include S30.

In S30, first request information is initiated to the fourth base station. The first request information is at least configured to request the fourth base station to transmit the configuration information of the discontinuous data transmission parameter of the fourth base station itself.

In other embodiments of the disclosure, before receiving the configuration information of the discontinuous data transmission parameter of the fourth base station, the "interacting with the fourth base station for the configuration information of the discontinuous data transmission parameter" may further include S35.

In S35, first instruction information is transmitted to the fourth base station.

The first instruction information is configured to instruct base stations to negotiate and use the configuration information of the discontinuous data transmission parameter tending to be uniform.

Correspondingly, in a case that the interacting method is performed by the fourth base station, the "interacting with the third base station for the configuration information of the discontinuous data transmission parameter" may include: receiving the first instruction information.

S30, S31 and S35 may constitute a simple interaction process.

S35 and S30 may be performed simultaneously or separately, the execution sequence of S35 and S30 is not limited herein. In addition, in other embodiments of the disclosure, the first instruction information may be carried in the process of transmitting the first request information. For example, the first instruction information and the first request information may be carried in a same message, and the first instruction information and the first request information may be transmitted simultaneously by transmitting the message. The relationship between the step of transmitting the first instruction information and other steps will be described below.

A relatively complicated interaction process is described below.

In other embodiments of the disclosure, the fourth base station may transmit the first instruction information to the third base station. In addition, in other embodiments of the disclosure, the first instruction information may be carried in the process of transmitting the configuration information of the discontinuous data transmission parameter of the fourth base station (by the fourth base station). For example, the first instruction information and the configuration information of the discontinuous data transmission parameter of the fourth base station may be carried in a same message. The relationship between the step of transmitting the first instruction information and other steps will be described below.

Figure 8:
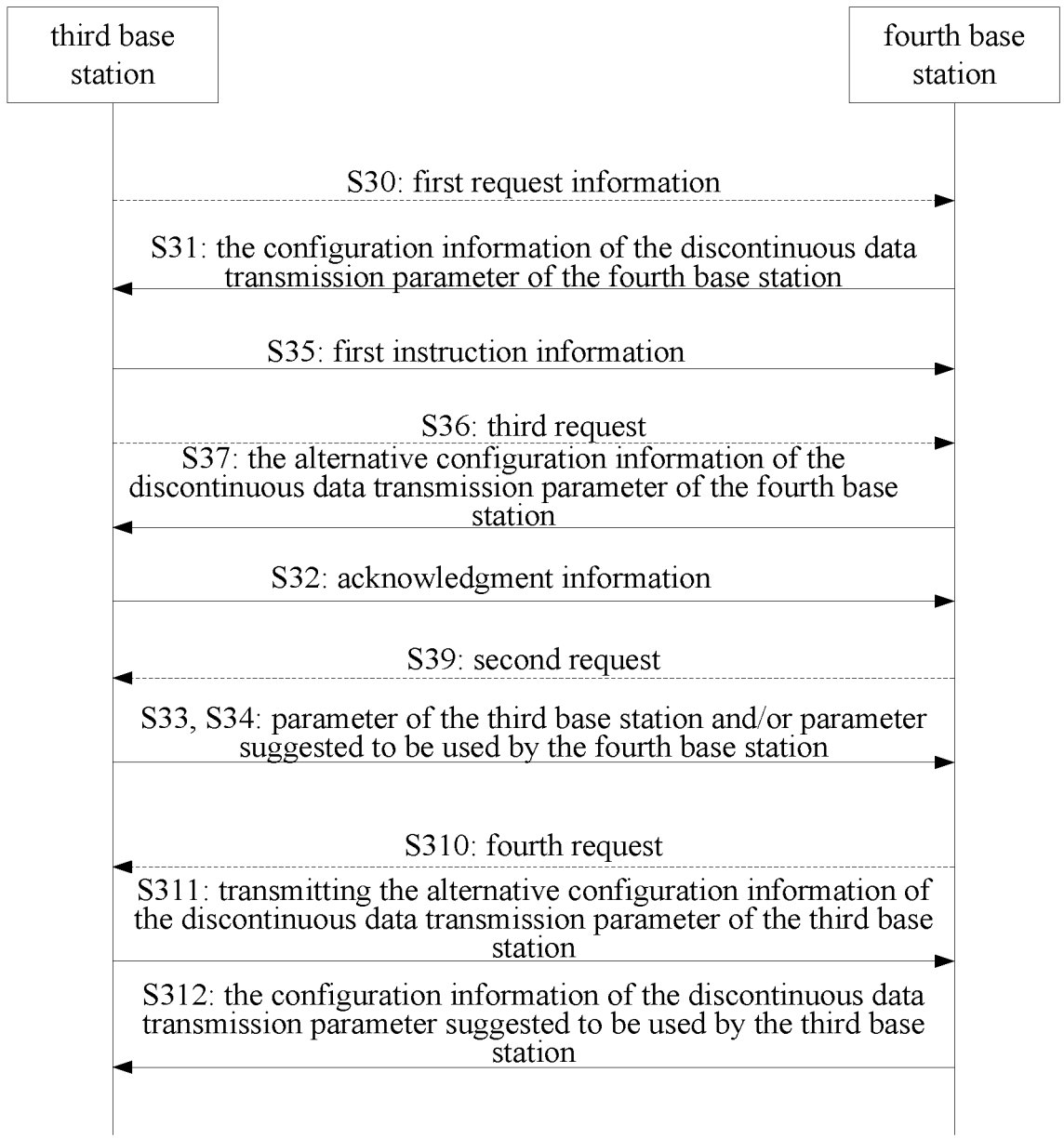
FIG. 8 is another flow chart of an information interacting method according to an embodiment of the disclosure.

In other embodiments of the disclosure, referring to FIG. 8, the "interacting with the fourth base station for the configuration information of the discontinuous data transmission parameter" may further include S37.

In S37, alternative configuration information of the discontinuous data transmission parameter of the fourth base station is received.

Correspondingly, in a case that the interacting method is performed by the fourth base station, the "interacting with the third base station for the configuration information of the discontinuous data transmission parameter" may further include: transmitting alternative configuration information of the discontinuous data transmission parameter of the fourth base station.

In other embodiments of the disclosure, before performing S37, the "interacting with the fourth base station for the configuration information of the discontinuous data transmission parameter" may further include S36.

In S36, third request information is initiated to the fourth base station. The third request information is configured to request transmitting the alternative configuration information of the discontinuous data transmission parameter of the fourth base station.

The third request information and the first request information may be a same request information or different request information.

Correspondingly, in a case that the interacting method is performed by the fourth base station, the "interacting with the third base station for the configuration information of the discontinuous data transmission parameter" may further include: receiving the third request information.

In other embodiments of the disclosure, the third base station may carry the first instruction information in the process of transmitting the third request information.

Similarly, in other embodiments of the disclosure, the fourth base station may carry the first instruction information in the process of transmitting the alternative configuration information of the discontinuous data transmission parameter. The function of the alternative configuration information of the discontinuous data transmission parameter of the fourth base station will be described below.

In other embodiments of the disclosure, referring to FIG. 7 again, after receiving "the configuration information of the discontinuous data transmission parameter of the fourth base station" or "the alternative configuration information of the discontinuous data transmission parameter of the fourth base station", the "interacting with the fourth base station for the configuration information of the discontinuous data transmission parameter" may further include S32.

In S32, acknowledgment information is returned (by the third base station).

Correspondingly, in a case that the interacting method is performed by the fourth base station, the "interacting with the third base station for the configuration information of the discontinuous data transmission parameter" may further include: receiving the acknowledgment information returned by the third base station.

In other embodiments of the disclosure, the "interacting with the fourth base station for the configuration information of the discontinuous data transmission parameter" may further include S33 and/or S34.

In S33, the configuration information of the discontinuous data transmission parameter of the third base station is transmitted to the fourth base station.

In addition/alternatively, in S34, the configuration information of the discontinuous data transmission parameter suggested to be used by the fourth base station is transmitted to the fourth base station.

More specifically, "the configuration information of the discontinuous data transmission parameter suggested to be used by the fourth base station" in S34 may be selected from the received alternative configuration information of the discontinuous data transmission parameter of the fourth base station.

Correspondingly, in a case that the interacting method is performed by the fourth base station, the "interacting with the third base station for the configuration information of the discontinuous data transmission parameter" may further include:

receiving the configuration information of the discontinuous data transmission parameter of the third base station; and/or receiving the configuration information of the discontinuous data transmission parameter that the third base station suggests the fourth base station using.

S33 and S34 may be independent from each other. Alternatively, the configuration information of the discontinuous data transmission parameter of the third base station and/or the configuration information of the discontinuous data transmission parameter suggested to be used by the fourth base station may be carried in the acknowledgment information. Similarly, the step of receiving by the fourth base station side the configuration information of the discontinuous data transmission parameter of the third base station and/or the configuration information of the discontinuous data transmission parameter suggested to be used by the fourth base station may be an independent step or may be combined into the step of receiving the acknowledgment information.

In other embodiments of the disclosure, before the third base station transmits the configuration information of the discontinuous data transmission parameter of the third base station and/or the configuration information of the discontinuous data transmission parameter suggested to be used by the fourth base station, the third base station may further perform S39.

In S39, second request information initiated by the fourth base station is received. The second request information is configured to request transmitting the configuration information of the discontinuous data transmission parameter of the third base station and/or the configuration information of the discontinuous data transmission parameter suggested to be used by the fourth base station.

Correspondingly, the operation performed by the fourth base station is: transmitting the second request information.

It should be noted that, after receiving the configuration information of the discontinuous data transmission parameter that the third base station suggests the fourth base station using, the fourth base station may adopt the suggestion from the third base station directly, and in this case, the negotiation is completed. Alternatively, the fourth base station may not adopt the suggestion from the third base station, and in this case, the fourth base station may retransmit to the third base station the configuration information of the discontinuous data transmission parameter of the fourth base station itself, and the third base station re-performs S31 and so on again until the fourth base station adopts the suggestion. Alternatively, the fourth base station may transmit to the third base station the configuration information of the discontinuous data transmission parameter suggested to be used by the third base station. The third base station may determine whether to adopt the suggestion from the fourth base station.

In other embodiments of the disclosure, the "interacting with the fourth base station for the configuration information of the discontinuous data transmission parameter" may further include S311.

In S311, the alternative configuration information of the discontinuous data transmission parameter of the third base station is transmitted.

Correspondingly, in a case that the interacting method is performed by the fourth base station, the "interacting with the third base station for the configuration information of the discontinuous data transmission parameter" may further include: receiving the alternative configuration information of the discontinuous data transmission parameter of the third base station.

In other embodiments of the disclosure, before S311, the "interacting with the fourth base station for the configuration information of the discontinuous data transmission parameter" may further include S310.

In S310, a fourth request transmitted by the fourth base station is received. The fourth request is configured to request transmitting the alternative configuration information of the discontinuous data transmission parameter of the third base station.

In other embodiments of the disclosure, the fourth request information and the second request information may be the same request information or different request information.

Correspondingly, in a case that the interacting method is performed by the fourth base station, the "interacting with the third base station for the configuration information of the discontinuous data transmission parameter" may further include: transmitting the fourth request.

The fourth base station may return acknowledgment information after receiving the configuration information of the discontinuous data transmission parameter of the third base station or the alternative configuration information of the discontinuous data transmission parameter of the third base station.

In other embodiments of the disclosure, the "interacting with the fourth base station for the configuration information of the discontinuous data transmission parameter" may further include S312.

In S312, the configuration information of the discontinuous data transmission parameter that the fourth base station suggests the third base station using is received.

Correspondingly, the step performed by the fourth base station may include: transmitting the configuration information of the discontinuous data transmission parameter suggested to be used by the third base station.

The configuration information of the discontinuous data transmission parameter suggested to be used by the third base station may be selected from the alternative configuration information of the discontinuous data transmission parameter of the third base station which is received by the fourth base station.

The configuration information of the discontinuous data transmission parameter suggested to be used by the third base station may be carried by the acknowledgment information returned by the fourth base station.

In addition, whether the configuration information is the configuration information that the third base station suggests the fourth base station using or the configuration information that the fourth base station suggests the third base station using, the suggested configuration information tends to be uniform with the configuration information of the discontinuous data transmission parameter of the other party.

It should be noted that at lease one of the configuration information of the discontinuous data transmission parameter of the third base station, the configuration information of the discontinuous data transmission parameter suggested to be used by the fourth base station and the alternative configuration information of the discontinuous data transmission parameter of the third base station may be carried by the acknowledgment information returned by the third base station to the fourth base station.

The first instruction information transmitted to the fourth base station is carried in the process of transmitting the first request, or in a process of transmitting the third request, or in the process of transmitting the configuration information of the discontinuous data transmission parameter of the third base station, or in the process of transmitting the configuration information of the discontinuous data transmission parameter suggested to be used by the fourth base station, or in the process of transmitting the alternative configuration information of the discontinuous data transmission parameter of the third base station, or in the process of returning the acknowledgment information to the fourth base station.

The first instruction information transmitted by the fourth base station is carried in the process of transmitting the second request, or in the process of transmitting the fourth request, or in the process of transmitting the configuration information of the discontinuous data transmission parameter of the fourth base station, or in the process of transmitting the alternative configuration information of the discontinuous data transmission parameter of the fourth base station, or in the process of transmitting the configuration information of the discontinuous data transmission parameter suggested to be used by the third base station, or in the process of returning the acknowledgment information to the third base station.

In other embodiments of the disclosure, the interacting method may further include:

receiving (by the third base station or the fourth base station) second instruction information reported by the UE. The second instruction information is configured to request configuring configuration information of the discontinuous data transmission parameter tending to be uniform.

The second instruction information may include at least one of radio frequency information and a request for requesting using the configuration information of the discontinuous data transmission parameter tending to be uniform for the base stations/cells.

The radio frequency information may include at least one of: the number of radio frequency devices used by the UE, indicating that the UE uses a same radio frequency device for uplink multicarrier, and indicating that the UE uses a same radio frequency device for downlink multicarrier.

A triggering condition for reporting the second instruction information includes: the UE determining that uplink multicarrier is able to use a same radio frequency device, and/or downlink multicarrier is able to use a same radio frequency device.

Some UE may be equipped with one or more radio frequency deices (abbreviated as RF) in hardware. For the UE, the triggering condition for reporting the second instruction information is met as long as the uplink multicarrier is able to use a same radio frequency device and/or the downlink multicarrier is able to use a same radio frequency device, regardless of the number of RF of the UE.

The uplink multicarrier may include an uplink carrier of the third base station and an uplink carrier of the fourth base station. The downlink multicarrier may include a downlink carrier of the third base station and a downlink carrier of the fourth base station.

In other embodiments of the disclosure, a condition for transmitting the first instruction information in all the above embodiments may include at least one of: the third base station or the fourth base station receiving the second instruction information reported by the UE, the third base station or the fourth base station determining that a same radio frequency device is able to be used for the uplink multicarrier of the UE, and the third base station or the fourth base station determining that a same radio frequency device is able to be used for the downlink multicarrier of the UE.

The step performed by the UE includes: reporting the second instruction information to the third base station and/or the fourth base station. The second instruction information is configured to request configuring the configuration information of the discontinuous data transmission parameter tending to be uniform.

The related content of the second instruction information, the triggering condition for reporting the second instruction information, the configuration information of the discontinuous data transmission parameter and the tending to be uniform may refer to the above description, which is not described herein.

The UE may report the second instruction information by means of an RRC message, a media access control control element or a physical layer command.

In other embodiments of the disclosure, the UE may further perform the following step:

receiving the configuration information of the discontinuous data transmission parameter tending to be uniform (issued by the third base station or the fourth base station).

In addition, it is mentioned above that the third base station and/or the fourth base station may transmit the third data to the UE. In practice, the UE may report the second instruction information after the UE receives the third data and finds that the third data does not carry the configuration information of the discontinuous data transmission parameter tending to be uniform. The UE then receives the configuration information of the discontinuous data transmission parameter tending to be uniform.

Alternatively, the UE may directly report the second instruction information, and then receive the configuration information of the discontinuous data transmission parameter tending to be uniform.

From a view of apparatus, in a case that the information interacting apparatus is the third base station, the information interacting apparatus may at least include a third transceiver. The third transceiver is configured to interact with the fourth base station for the configuration information of the discontinuous data transmission parameter, so that at least one of the following is achieved: the base station side performing scheduling on the use equipment, the base station side performing mobility management on the UE, the configuration information of the discontinuous data transmission parameter tending to be uniform being used for base stations, and the power of the user equipment UE being saved. The base station side includes at least one of the third base station and the fourth base station.

In a case that the information interacting apparatus is the fourth base station, the information interacting apparatus may at least include a fourth transceiver. The fourth transceiver is configured to interact with the third base station for the configuration information of the discontinuous data transmission parameter.

It should be noted that, in practice, a certain base station may act as the third base station or the fourth base station. Therefore, the interacting apparatus may include both the third transceiver and the fourth transceiver. The third transceiver and the fourth transceiver may be a same hardware device or two hardware devices independent from each other.

In consideration that a certain base station may act as the first base station or the second base station, the base station may include all the first CPU 1, the third CPU 5, the first transmitter 2, the storage 6, the third transceiver and the fourth transceiver. The first CPU 1 and the third CPU 5 may be a same hardware device or two hardware devices independent from each other. The first transmitter 2, the third transceiver and the fourth transceiver may be a same hardware device or three hardware devices independent from each other.

In addition, it is mentioned above that the third base station and/or the fourth base station transmit the third data to the UE. In a case that the interacting apparatus is the UE, the interacting apparatus may include a first receiver. The first receiver is configured to receive the third data including the configuration information of the discontinuous data transmission parameter of the third base station and/or the fourth base station, so that measurement and/or data transmission can be performed according to the third data.

Alternatively, in a case that the interacting apparatus is the UE, the interacting apparatus may include a fifth receiver. The fifth receiver is configured to report the second instruction information, receive the configuration information of the discontinuous data transmission parameter tending to be uniform, and receive the third data.

In addition, the UE may further include the first transceiver 3, the second transceiver 7 and the second CPU 4. The first transceiver 3, the second transceiver 7 and the first receiver may be a same hardware device or three hardware devices independent from each other.

In a scene of a heterogeneous network, the UE moves among the macro base station with large coverage and multiple small base stations with small coverage. Therefore, frequent handover or handover failure may be caused due to the UE selecting to reside in the small base station (small cell) and frequently moving.

The handover here includes handover in a data distribution manner or handover in a split bearer manner.

In view of this, it is provided a residing method and a residing apparatus according to embodiments.

The residing method may be performed by a base station or a UE. In the embodiment, the residing method is mainly performed by a base station or a cell.

The residing method may include: transmitting indication information to the UE.

The indication information may be transferred by means of broadcast or a special signaling.

In a case that the residing method is performed by a UE, the residing method may include:

receiving the indication information transmitted by the base station side; and residing according to the indication information.

The UE may pertinently reside according to the indication information, thereby at least the frequent handover or the handover failure due to the frequent movement can be reduced.

The indication information is configured to indicate at least one of: whether the UE (in an idle state and/or in a connection state) being able to reside in this cell, a reside-able object in which the UE (in the idle state and/or in the connection state) is able to reside, a non-reside-able object in which the UE (in the idle state and/or in the connection state) is unable to reside, and size and type of a cell.

Figure 5:
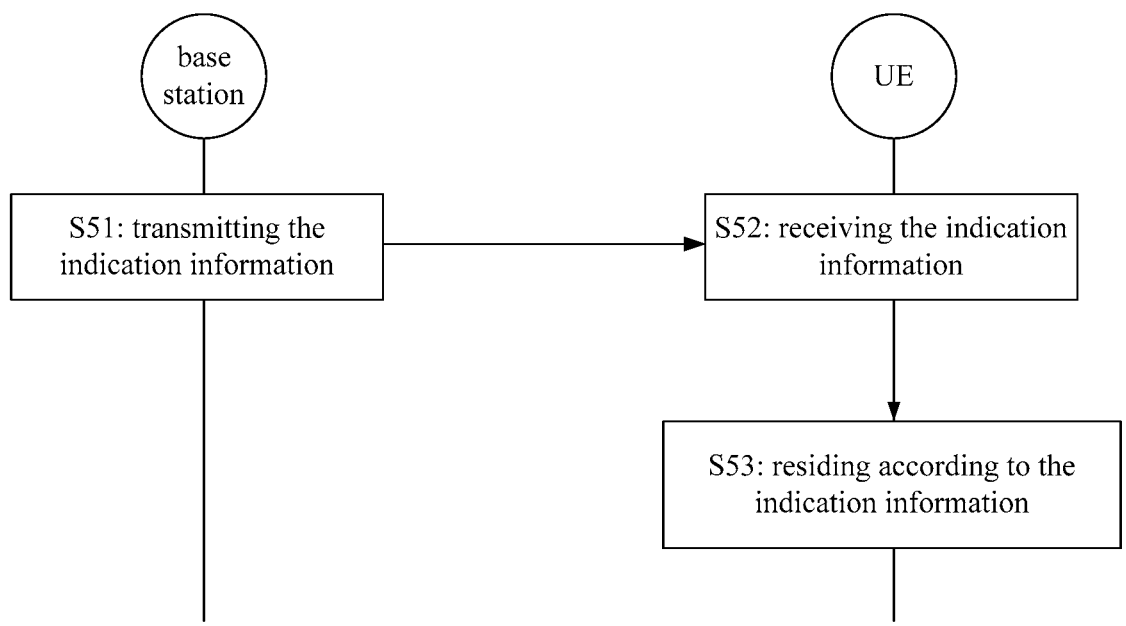
FIG. 5 is another flow chart of interacting between a base station and a UE according to an embodiment of the disclosure.

Referring to FIG. 5, the interaction between the base station and the UE includes S51 to S53.

In S51, the base station transmits the indication information.

In S52, the UE receives the indication information.

In S53, the UE resides according to the indication information.

From a view of apparatus, the residing apparatus corresponding to the base station may at least include a second transmitter. The second transmitter is configured to transmit the indication information to the UE.

The residing apparatus corresponding to the UE may at least include a second receiver and a fourth CPU. The second receiver is configured to receive the indication information transmitted by the base station side. The fourth CPU is configured to reside according to the indication information.

In addition, the residing apparatus corresponding to the base station may further include a first CPU 1, a third CPU 5, a first transmitter 2, a storage 6, a third transceiver and a fourth transceiver. The first CPU 1 and the third CPU 5 may be a same hardware device or two hardware devices independent from each other. The second transmitter, the first transmitter 2, the third transceiver and the fourth transceiver may be a same hardware device or four hardware devices independent from each other.

Similarly, the residing apparatus corresponding to the UE may further include a second CPU 4, a fourth CPU, a first transceiver 3, a second transceiver 7 and a first receiver. The second CPU 4 and the fourth CPU may be a same hardware device or two hardware devices independent from each other. The first transceiver 3, the second transceiver 7 and the first receiver may be a same hardware device or three hardware devices independent from each other.

In other embodiments of the disclosure, the reside-able object includes at least one of a reside-able cell and a reside-able base station, and the non-reside-able object includes at least one of a non-reside-able cell and a non-reside-able base station.

The cell in the "size and type of a cell" may refer to this cell and/or a neighbor cell. In the embodiment, the neighbor cell refers to cells other than this cell. The "size and type" may include a large cell, a macro cell, a micro-cell, a pico-cell, a femto-cell and so on, and coverages of different types of cells are different.

The UE herein may be a UE in subsequent version of LTE R12.

The following situation is considered. Generally, it is desirable that the UE in the connection state is reside-able in a small cell and the small cell provides service for the UE to mitigate the load of the macro base station. After the service is finished, it is desirable that the UE in the idle state does not reside in the small cell but preferentially resides in the macro base station with large coverage, to avoid the frequent handover or the handover failure due to the movement of the UE. Hence, it may be designed that the cell sends indication information to the UE, to notify whether the UE in the idle state being reside-able in this cell, or to recommend the reside-able cell/base station (i.e., the reside-able object) for the UE in the idle state, or to notify the non-reside-able cell/base station (i.e., the non-reside-able object) for the UE in the idle state, or to indicate the size and type of the cell so that the UE determines by itself whether to reside based on the size and type of the cell, and so on. In this way, the UE switched in the idle state selects to reside in the reside-able cell/base station for the UE in the idle state, or selects to reside in a cell with larger coverage, to avoid frequent cell reselection or handover.

The cell may also notify whether the UE in the connection state being reside-able in this cell, or recommend the reside-able cell/base station for the UE in the connection state, or notify the non-reside-able cell/base station for the UE in the connection state, or indicate the size and type of the cell so that the UE determines by itself whether to reside based on the size and type of the cell, and so on. In this way, the UE switched in the connection state selects to reside in the reside-able cell/base station for the UE in the connection state, to mitigate the load of the macro base station.

In practical communication, there may be other cases and other requirements. The content included in the indication information may be designed flexibly as required by those ordinary skilled in the art, which is not described herein.

In other embodiments of the disclosure, the reside-able base station is an alternative base station which can act as the first base station (anchor base station). There are many advantages in this design. One of the advantages is that the UE may select one base station from the recommended reside-able base stations as the anchor base station to reside in when the UE turns on.

Furthermore, in other embodiments of the disclosure, the indication information in all the above embodiments may be further configured to carry priority information of the reside-able object. In this way, the UE may select to reside in the reside-able object with the highest priority.

The above priority may exist in the indication information in an explicit manner or an implicit manner. The explicit manner refers to that the priority of each reside-able object is identified by a priority identification and so on. For example, "00", "01", "10" and "11" are used as the priority identifications to identify the priority of each reside-able object. The implicit manner refers to that the priority is characterized by a rank of the reside-able object. For example, the reside-able objects are ranked in a descending rank of the priority, and the priority of each reside-able object is characterized by the rank of the reside-able objects. The priority of the first reside-able object is the maximum, and the priority of the last reside-able object is the minimum.

The embodiments of the present disclosure are described herein in a progressive manner, with an emphasis placed on explaining the difference between each embodiment and the other embodiments; hence, for the same or similar parts among the embodiments, they can be referred to from one another. For the device provided according to the embodiments, the corresponding descriptions are relatively simple because the device corresponds to the methods provided according to the embodiments. The relevant portions may be referred to the description for the method parts.

The cell involved in various embodiments of the specification may be the conventional cell, a cell of a new carrier type or a cell designed in future, which is not limited herein.

It should be also noted that the relationship terminologies such as first and second are only used herein to distinguish an entity or operation from another entity or operation, and it is not necessarily required or implied that there are any actual relationship or order of this kind between those entities and operations. Moreover, the terminologies of "include", "including" and any other variants are intended to cover non-exclusive contains, so that the processes, methods, articles or devices including a series of elements not only include those elements but also include other elements that are not listed definitely or also include the elements inherent in the processes, methods, articles or devices. In the case of no more restrictions, the elements defined by the statement "include one . . . " do not exclude that other same elements also exist in the processes, methods, articles or devices including the elements.

According to the above-mentioned description of the embodiments, the skilled in the art may understand clearly that the disclosure may be implemented by using a software in conjunction with a necessary universal hardware including an universal integrated circuit, an universal CPU, an universal memory and an universal element, or may be implemented in dedicated hardware including a dedicated integrated circuit, a dedicated CPU, a dedicated memory and a dedicated element, with the former being a more preferable embodiment. Based on this understanding, the essence of the technical solution of the disclosure, i.e. the part of the technical solution of the disclosure which contributes to the prior art, may be embodied in a software production. The computer software production may be stored in a readable storage medium such as various media capable of storing software program code, such as a U disk, a mobile storage media, a Read-only Memory (ROM), a Random Access Memory (RAM), a disk or a CD. The computer software production includes a number of instructions for making a computer device (which may be a personal computer, a server, or a network device) to perform the embodiments of the method according to the disclosure.

The description of the embodiments herein enables those skilled in the art to implement or use the present disclosure. Numerous modifications to the embodiments will be apparent to those skilled in the art, and the general principle herein can be implemented in other embodiments without deviation from the spirit or scope of the present disclosure. Therefore, the present disclosure will not be limited to the embodiments described herein, but in accordance with the widest scope consistent with the principle and novel features provided herein.

What is claimed is:

1. An apparatus comprising a processor, a receiver and a transmitter, wherein:
   the receiver is configured to receive first configuration information of a discontinuous data transmission parameter of a fourth base station from the fourth base station;
   the transmitter is configured to transmit second configuration information of the discontinuous data transmission parameter of the apparatus to the fourth base station;
   the transmitter is further configured to transmit data to a user equipment (UE), wherein the data comprises configuration information of the discontinuous data transmission parameter of the apparatus and the fourth base station;
   the first and second configuration information of the discontinuous data transmission parameter comprises configuration information of a discontinuous reception (DRX) parameter; and
   the configuration information of the DRX parameter comprises a periodicity of DRX or an initial persistent timer,
   wherein:
   (a) starting positions of DRX for both the apparatus and the fourth base station are the same;
   (b) a proportion between an initial persistent timer corresponding to the apparatus and an initial persistent timer corresponding to the fourth base station is m, wherein m is a natural number; or
   (c) a proportion between a periodicity of DRX corresponding to the apparatus and a periodicity of DRX corresponding to the fourth base station is n, wherein n is a natural number.

2. The apparatus according to claim 1, wherein the discontinuous data transmission parameter is used for performing scheduling on the UE.

3. The apparatus according to claim 1, wherein the transmitter is configured to, before receiving the first configuration information of the discontinuous data transmission parameter of the fourth base station, send a request information to the fourth base station, wherein the request information is used for requesting the fourth base station to transmit the first configuration information of the discontinuous data transmission parameter of the fourth base station.

4. The apparatus according to claim 1, wherein the transmitter is configured to transmit data to the UE, wherein the data comprises the second configuration information of the discontinuous data transmission parameter of the apparatus and/or the first configuration information of the discontinuous data transmission parameter of the fourth base station.

5. An apparatus comprising a processor, a receiver and a transmitter, wherein:
   the transmitter is configured to transmit to a third base station first configuration information of a discontinuous data transmission parameter of the apparatus;
   the receiver is configured to receive second configuration information of the discontinuous data transmission parameter of the third base station;
   the third base station is configured to transmit data to a user equipment (UE), wherein the data comprises configuration information of the discontinuous data transmission parameter of the apparatus and the third base station;
   the first and second configuration information of the discontinuous data transmission parameter comprises configuration information of a discontinuous reception (DRX) parameter; and
   the configuration information of the DRX parameter comprises a periodicity of DRX or an initial persistent timer,
   wherein:
   (a) starting positions of DRX for both the third base station and the apparatus are the same;
   (b) a proportion between an initial persistent timer corresponding to the third base station and an initial persistent timer corresponding to the apparatus is m, wherein m is a natural number; or (c) a proportion between a periodicity of DRX corresponding to the third base station and a periodicity of DRX corresponding to the apparatus is n, wherein n is a natural number.

6. The apparatus according to claim 5, wherein the receiver is configured to, before transmitting the first configuration information of the discontinuous data transmission parameter of the apparatus, receive a request information from the third base station, wherein the request information is used for requesting the apparatus to transmit the first configuration information of the discontinuous data transmission parameter of the apparatus.

7. A method for configuration information transmission, applied in a third base station, the method comprising:
transmitting a request information to a fourth base station, wherein the request information is used for requesting the fourth base station to transmit first configuration information of a discontinuous data transmission parameter of the fourth base station;
receiving, by the third base station, the first configuration information of the discontinuous data transmission parameter of the fourth base station from the fourth base station;
adjusting second configuration information of the discontinuous data transmission parameter of the third base station based on the first configuration information of the discontinuous data transmission parameter of the fourth base station;
scheduling, by the third base station, a user equipment (UE) according to the second configuration information of the discontinuous data transmission parameter of the third base station; and
transmitting data to the UE, wherein the data comprises configuration information of the discontinuous data transmission parameter of the third base station and the fourth base station,
wherein the configuration information of the discontinuous data transmission parameter comprises configuration information of a discontinuous reception (DRX) parameter, and
wherein the configuration information of the DRX parameter comprises a periodicity of DRX or an initial persistent timer,
wherein:
(a) starting positions of DRX for both the third base station and the fourth base station are the same;
(b) a proportion between an initial persistent timer corresponding to the third base station and an initial persistent timer corresponding to the fourth base station is m, wherein m is a natural number; or
(c) a proportion between a periodicity of DRX corresponding to the third base station and a periodicity of DRX corresponding to the fourth base station is n, wherein n is a natural number.

8. The method according to claim 7, wherein the method further comprises:
transmitting, by the third base station, data to the UE, wherein the data comprises the second configuration information of the discontinuous data transmission parameter of the third base station and/or the first configuration information of the discontinuous data transmission parameter of the fourth base station.

9. A method for configuration information transmission, applied in a fourth base station, the method comprising:
receiving, by the fourth base station, a request information from a third base station, wherein the request information is used for requesting the fourth base station to transmit configuration information of a discontinuous data transmission parameter of the fourth base station;
transmitting, by the fourth base station to the third base station, the configuration information of the discontinuous data transmission parameter of the fourth base station; and
scheduling, by the fourth base station, a user equipment (UE) according to the configuration information of the discontinuous data transmission parameter of the fourth base station;
wherein the third base station is configured to transmit data to the UE, wherein the data comprises configuration information of the discontinuous data transmission parameter of the third base station and the fourth base station,
wherein the configuration information of the discontinuous data transmission parameter comprises configuration information of a discontinuous reception (DRX) parameter, and
wherein the configuration information of the DRX parameter comprises a periodicity of DRX or an initial persistent timer,
wherein:
(a) starting positions of DRX for both the third base station and the fourth base station are the same;
(b) a proportion between an initial persistent timer corresponding to the third base station and an initial persistent timer corresponding to the fourth base station is m, wherein m is a natural number; or
(c) a proportion between a periodicity of DRX corresponding to the third base station and a periodicity of DRX corresponding to the fourth base station is n, wherein n is a natural number.

10. A non-transitory computer readable medium having instructions stored thereon, the instructions executable by one or more processors for:
transmitting a request information to a fourth base station, wherein the request information is used for requesting the fourth base station to transmit first configuration information of a discontinuous data transmission parameter of the fourth base station;
receiving the first configuration information of the discontinuous data transmission parameter of the fourth base station from the fourth base station;
adjusting second configuration information of the discontinuous data transmission parameter of a third base station based on the first configuration information of the discontinuous data transmission parameter of the fourth base station;
scheduling a user equipment (UE) according to the second configuration information of the discontinuous data transmission parameter of the third base station; and
transmitting data to the UE, wherein the data comprises configuration information of the discontinuous data transmission parameter of the third base station and the fourth base station,
wherein the first and second configuration information of the discontinuous data transmission parameter comprises configuration information of a discontinuous reception (DRX) parameter, and
wherein the configuration information of the DRX parameter comprises a periodicity of DRX or an initial persistent timer,
wherein:
(a) starting positions of DRX for both the third base station and the fourth base station are the same;

(b) a proportion between an initial persistent timer corresponding to the third base station and an initial persistent timer corresponding to the fourth base station is m, wherein m is a natural number; or
(c) a proportion between a periodicity of DRX corresponding to the third base station and a periodicity of DRX corresponding to the fourth base station is n, wherein n is a natural number.

11. A non-transitory computer readable medium having instructions stored thereon, the instructions executable by one or more processors for:
receiving, by a fourth base station, a request information from a third base station, wherein the request information is used for requesting the fourth base station to transmit configuration information of a discontinuous data transmission parameter of the fourth base station;
transmitting, to the third base station, the configuration information of the discontinuous data transmission parameter of the fourth base station; and
scheduling, a user equipment (UE) according to the configuration information of the discontinuous data transmission parameter of the fourth base station;
wherein the third base station is configured to transmit data to the UE, wherein the data comprises configuration information of the discontinuous data transmission parameter of the third base station and the fourth base station,
wherein the configuration information of the discontinuous data transmission parameter comprises configuration information of a discontinuous reception (DRX) parameter, and
wherein the configuration information of the DRX parameter comprises a periodicity of DRX or an initial persistent timer,
wherein:
(a) starting positions of DRX for both the third base station and the fourth base station are the same;
(b) a proportion between an initial persistent timer corresponding to the third base station and an initial persistent timer corresponding to the fourth base station is m, wherein m is a natural number; or
(c) a proportion between a periodicity of DRX corresponding to the third base station and a periodicity of DRX corresponding to the fourth base station is n, wherein n is a natural number.

* * * * *

UNITED STATES PATENT AND TRADEMARK OFFICE
CERTIFICATE OF CORRECTION

PATENT NO.          : 11,477,679 B2                                   Page 1 of 1
APPLICATION NO.     : 16/942348
DATED               : October 18, 2022
INVENTOR(S)         : Shi et al.

It is certified that error appears in the above-identified patent and that said Letters Patent is hereby corrected as shown below:

On the Title Page

Item (30) Foreign Application Priority Data: "Aug. 9, 2013 (WO) ................ PCT/CN2013/081218"
should read -- Aug. 9, 2013 (CN) ................ PCT/CN2013/081218 --.

Signed and Sealed this
Fourteenth Day of March, 2023

Katherine Kelly Vidal
*Director of the United States Patent and Trademark Office*